US012573568B2

(12) United States Patent
Brower et al.

(10) Patent No.: US 12,573,568 B2
(45) Date of Patent: Mar. 10, 2026

(54) POWER SWITCH ASSEMBLY HAVING INDICATORS AND REMOVABLE COVER

(71) Applicant: Hubbell Incorporated, Shelton, CT (US)

(72) Inventors: John E. Brower, Fairfield, CT (US); Christopher Alan Carbone, Newtown, CT (US); Zhenhong Li, Cheshire, CT (US)

( * ) Notice: Subject to any disclaimer, the term of this patent is extended or adjusted under 35 U.S.C. 154(b) by 325 days.

(21) Appl. No.: 18/484,487

(22) Filed: Oct. 11, 2023

(65) Prior Publication Data

US 2024/0128036 A1 Apr. 18, 2024

Related U.S. Application Data

(60) Provisional application No. 63/416,625, filed on Oct. 17, 2022.

(51) Int. Cl.
*H01H 19/14* (2006.01)
*H01H 9/54* (2006.01)
(Continued)

(52) U.S. Cl.
CPC .............. *H01H 19/14* (2013.01); *H01H 9/54* (2013.01); *H01H 19/025* (2013.01); *H01H 19/04* (2013.01)

(58) Field of Classification Search
CPC ...... H01H 19/14; H01H 19/11; H01H 19/585; H01H 19/58; H01H 19/62; H01H 19/635;
(Continued)

(56) References Cited

U.S. PATENT DOCUMENTS 5,736,698 A 4/1998 Mattlar et al.
6,100,485 A 8/2000 Mortun et al.
(Continued)

OTHER PUBLICATIONS

Leviton Product Information Instruction Sheet—Powerswitch—Non-Fused Safety Disconnect Switches in Watertight/Submersible Enclosures—EN, downloaded from https://leviton.com/products/lds30-axs on Mar. 31, 2025.
(Continued)

*Primary Examiner* — Ahmed M Saeed
(74) *Attorney, Agent, or Firm* — Verrill Dana, LLP; Robert L. Hover

(57) ABSTRACT

Power switch assemblies are provided herein each having a power switch enclosure including a box portion and a cover portion removably attachable to the box portion, a power switch installed in a box cavity and having a plurality of terminals, a handle shaft extending through a wall of the cover, and a monitor circuit including a circuit board attached to the cover, monitor circuitry formed on the circuit board, and a plurality of connectors installed on the circuit board, wherein the connectors are configured, upon attachment of the cover to the box, without manual disconnection or reconnection of wires, to electrically interact with a terminal of the power switch for electrical communication between the power switch and the monitor circuitry, and wherein the connectors are configured, without manual disconnection or reconnection of wires, to terminate the electrical interactions upon removal of the cover from the box.

20 Claims, 26 Drawing Sheets

(51) Int. Cl.
*H01H 19/02* (2006.01)
*H01H 19/04* (2006.01)

(58) Field of Classification Search
CPC ...... H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; H01R 12/88; H01R 13/5213; H01R 13/6275; H01R 13/447; H01R 13/453
See application file for complete search history.

(56) References Cited

U.S. PATENT DOCUMENTS

| | | | | |
|---|---|---|---|---|
| 9,224,548 | B2 * | 12/2015 | Dunker | H01H 9/104 |
| 9,828,789 | B2 | 11/2017 | Bulancea | |
| 10,522,305 | B2 * | 12/2019 | Carbone | H01H 9/0271 |
| 2014/0139047 | A1 | 5/2014 | Haines et al. | |
| 2015/0131209 | A1 * | 5/2015 | Cloran | H01H 9/22 361/622 |
| 2015/0348719 | A1 * | 12/2015 | Fuller | H01H 9/26 200/50.33 |
| 2016/0308343 | A1 | 10/2016 | Scanzillo et al. | |

OTHER PUBLICATIONS

Leviton Powerswitch Industrial Switches & Motor Controls Brochure, downloaded from https://leviton.com/products/lds30-axs on Mar. 31, 2025.
Leviton Product Bulletin, downloaded from https://leviton.com/products/lds30-axs on Mar. 31, 2025.
Leviton Technical Application Note, downloaded from https://leviton.com/products/lds30-axs on Mar. 31, 2025.
Leviton Industrial Devices with Inform Technology, downloaded from https://leviton.com/products/lds30-axs on Mar. 31, 2025.
Leviton LDS30-AXS—2D PDF, downloaded from https://leviton.com/products/lds30-axs on Mar. 31, 2025.
International Search Report and Written Opinion issued in corresponding International Application No. PCT/US23/76519, mailed Mar. 13, 2024, 8 pages.

* cited by examiner

POWER SWITCH ASSEMBLY HAVING INDICATORS AND REMOVABLE COVER

CROSS-REFERENCE TO RELATED APPLICATION

This application claims the benefit of priority to U.S. Provisional Application No. 63/416,625, filed Oct. 17, 2022, which is incorporated herein by reference.

FIELD OF THE INVENTION

This invention relates to power switches and more particularly to power switch assemblies having indicators and a removable cover.

BACKGROUND OF THE INVENTION

Electrically powered machinery, particularly important and/or potentially dangerous machinery such as, for example, Heating Ventilation Air Conditioning (HVAC) systems, mining equipment, sawmills, food processing equipment, wastewater treatment systems, conveyors, packaging machines, or other assembly line/warehouse equipment, fans, mixers, etc., generally requires a power switch. Such power switches are sometimes referred to as manual motor controllers (MMC), manual motor starters, manual motor protectors, manual starter protectors, or motor circuit protectors and are generally provide overload protection, short-circuit protection, and/or disconnection capability for isolating the motor from main power supply (mains). Many such power switches are installed in a power switch enclosure 101 and include a button, toggle, or, as shown in FIG. 1A (PRIOR ART), a rotary handle 102 for operating the power switch to permit manual, mechanical switching between connection and disconnection of the motor from mains.

In some applications, power switch enclosures 101 also include monitoring and indicator functionalities such as voltage/phase indication on both line and load sides of the switch/contactor. Indicators can include, for example, lights such as LEDs 104 shown in FIG. 1A. Conventionally, as shown in FIG. 1B (PRIOR ART), those monitoring/indicator functionalities require electrical connection between wire terminals 127 in a disconnection circuit 125, mounted in a base 103 of a power switch enclosure 101, and a printed circuit board (PCB) 151 mounted to a cover 105 of the power switch enclosure 101. Such connection must generally be made via labor intensive conventional wire assemblies with crimped connections or connectors. For example, as shown in FIG. 1B, seven different wires 109*a-g* must be connected both on the cover 105 at the PCB 151 and at the switch 125 in the base 103. Furthermore, any time such power switch enclosures 101 are serviced, the technician must either a) disconnect each of the wires 109*a-g* so that the cover 105 can be fully removed and/or replaced, then reconnect the wires 109*a-g* upon completion of the service, thereby creating yet more delay and labor cost on an ongoing basis, or b) must manage to perform the service without removing the cover 105 and without damaging or disconnecting the wires 109*a-g*, all while navigating around the wires 109*a-g*.

SUMMARY OF INVENTION

Provided herein are power switch enclosures having indicators and a removable cover.

In one aspect, a power switch assembly is provided. The power switch assembly includes a power switch enclosure. The power switch enclosure includes a box portion defining a box cavity. The power switch enclosure also includes a cover portion defining a cover cavity removably attachable to the box portion to form the power switch enclosure and to define an interior cavity comprising the combined box cavity and cover cavity. The power switch assembly also includes a power switch installed in the box cavity and having a plurality of terminals. The power switch assembly also includes a handle shaft extending through a wall of the cover portion, the handle shaft. The handle shaft includes a switch end extending into the interior cavity of the power switch enclosure and configured for operatively engaging the power switch. The handle shaft also includes a handle end extending out of the interior cavity and away from an exterior surface of the wall of the cover portion, the handle end configured for operatively engaging a handle positioned on the exterior surface of the wall of the cover portion. The power switch assembly also includes a monitor circuit. The monitor circuit includes a circuit board attached to the cover portion in the cover cavity, the circuit board having a first side facing the wall of the cover portion and a second side facing away from the wall of the cover portion. The monitor circuit also includes monitor circuitry formed on at least one of the first side or the second side of the circuit board. The monitor circuit also includes a plurality of connectors at least partially installed on the second side of the circuit board. The connectors are configured, upon attachment of the cover portion to the box portion and without manual disconnection or reconnection of wires, to electrically interact with a corresponding terminal of the power switch to establish electrical communication between the corresponding terminal of the power switch and the monitor circuitry of the monitor circuit. The connectors are also configured, without manual disconnection or reconnection of wires, to terminate the electrical interactions upon removal of the cover portion from the box portion.

In some embodiments, responsive to the electrical communication between the corresponding terminals of the power switch and the monitor circuit having the monitor circuitry, the monitor circuitry indicates a line status associated with the corresponding terminal of the power switch. In some embodiments, at least one alignment bracket mounted to the second side of the circuit board and including a guide surface extending from the second side of the circuit board, the guide surface sized and positioned to slide over an exterior surface of the power switch to align the connectors with the corresponding terminals of the power switch. In some embodiments, the connectors include one or more of spring-loaded pins, fixed point-contact pins, lever contacts, leaf spring contacts, HDMI connectors, USB connectors, USB-C connectors, Lightning connectors, hall effect sensors, field sensors, Rogowski coils, iron-core current transformers, or combinations thereof. In some embodiments, the terminals include one or more of contact terminals, terminal conductors, terminal screws, lever connectors, leaf springs, HDMI terminals, USB terminals, USB-C terminals, Lightning terminals, conductive plates, coils, or combinations thereof.

In some embodiments, the monitor circuitry includes one or more of LEDs, diodes, Zener diodes, resistors, microcontrollers, integrated chips, microprocessors, power monitoring circuitry, display elements, digital displays, screens, touch screens, auditory elements, sirens, speakers, alarms, horns, communications equipment, Wi-Fi circuitry, Bluetooth circuitry, Bluetooth low energy circuitry, ZigBee circuitry, cellular circuitry, RS485 circuitry, ethernet circuitry, transceivers, receivers, transmitters, signal processing circuitry, or combinations thereof. In some embodiments, the monitor circuitry is configured to monitor at least one characteristic of an electrical source electrically connected to the power switch. In some embodiments, the at least one characteristic includes one or more of voltage, frequency power level, power transmission signal characteristics, change in power transmission characteristics over time, power consumption, power failures, power surges, out of tolerance power conditions, or combinations thereof. In some embodiments, the monitor circuitry is further configured to at least one of collect monitoring data generated by the monitor circuitry, analyze monitoring data generated by the monitor circuitry, indicate a status of the monitored characteristic, transmit monitoring data generated by the monitor circuitry, transmit and indication of the status of the monitored characteristic, receive remote commands for operating the power switch, or combinations thereof.

In some embodiments, the monitor circuitry includes an LED circuit corresponding to each of the terminals of the power switch in communication with the monitor circuit having the monitor circuitry. In some embodiments, each LED circuit includes an LED configured to emit light responsive to a monitored voltage or earth ground continuity. In some embodiments, the wall of the cover portion includes a plurality of apertures each positioned to permit the light emitted by at least one of the LEDs to be transmitted therethrough.

In some embodiments, the power switch assembly also includes a lens device. In some embodiments, the lens device includes a base having first side facing the wall of the cover portion and a second side facing away from the wall of the cover portion. In some embodiments, the lens device includes plurality of lens elements formed on and extending from the first side of the base, the plurality of lens elements each corresponding to and extending into one of the plurality of apertures. In some embodiments, the lens device further comprises a plurality of lightguides formed on and extending from the second side of the base, each extending toward a corresponding one of the LEDs of the monitor circuitry, the plurality of light guides each configured to direct light emitted by the corresponding one of the LEDs through a corresponding one of the lens elements.

In some embodiments, the power switch assembly also includes a jog switch installed through the wall of the cover portion. In some embodiments, the power switch assembly includes a backplate attached to a wall of the box portion in the box cavity and having at least one conduit entry port defined therein. In some embodiments, the backplate includes a rail formed thereon and sized to engage one or more channels of the power switch. In some embodiments, the rail is integrally formed from the backplate. In some embodiments, the rail is separate from and attached to the backplate. In some embodiments, the rail is a DIN rail.

BRIEF DESCRIPTION OF THE FIGURES

Embodiments of the present disclosure will now be described, by way of example only, with reference to the attached Figures, wherein.

DETAILED DESCRIPTION OF THE INVENTION

Figure 1A:
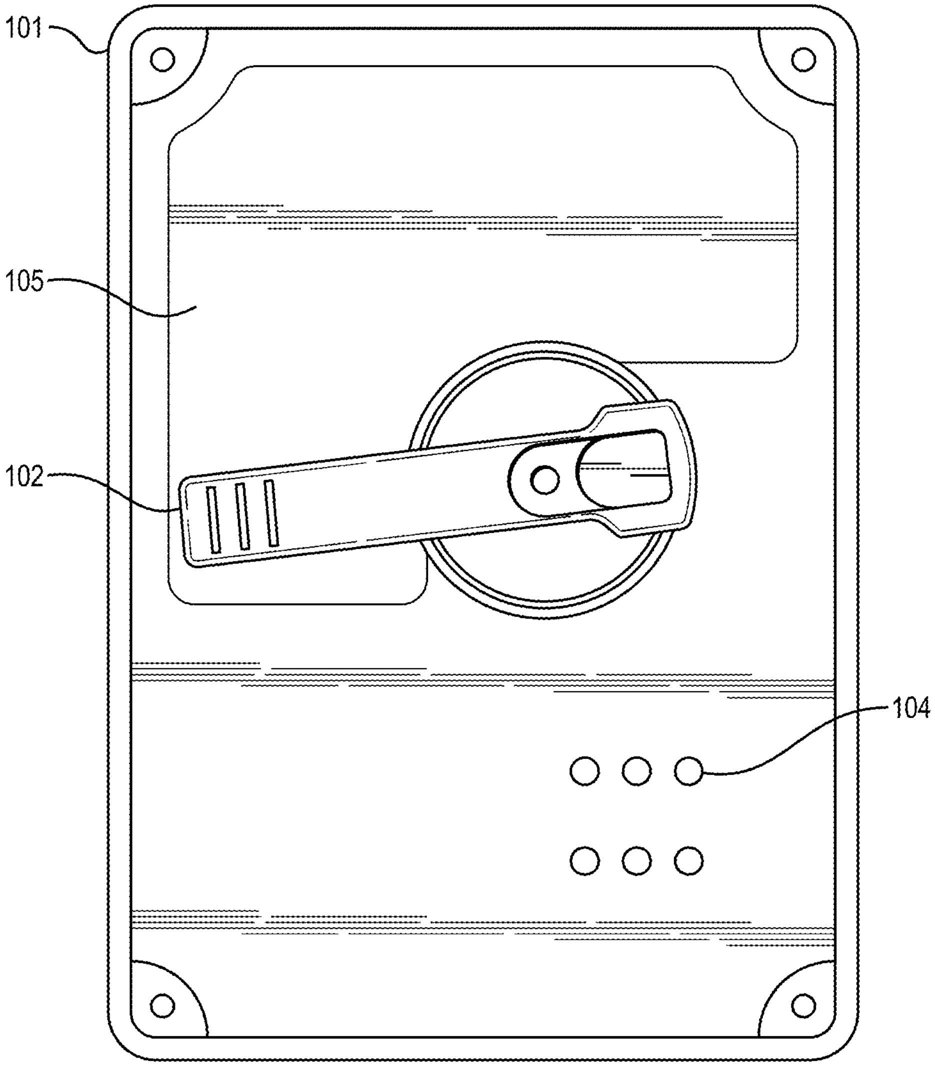
FIG. 1A (PRIOR ART)
FIG. 1A is an exterior view of a power switch enclosure in accordance with the prior art.
Figure 1B:
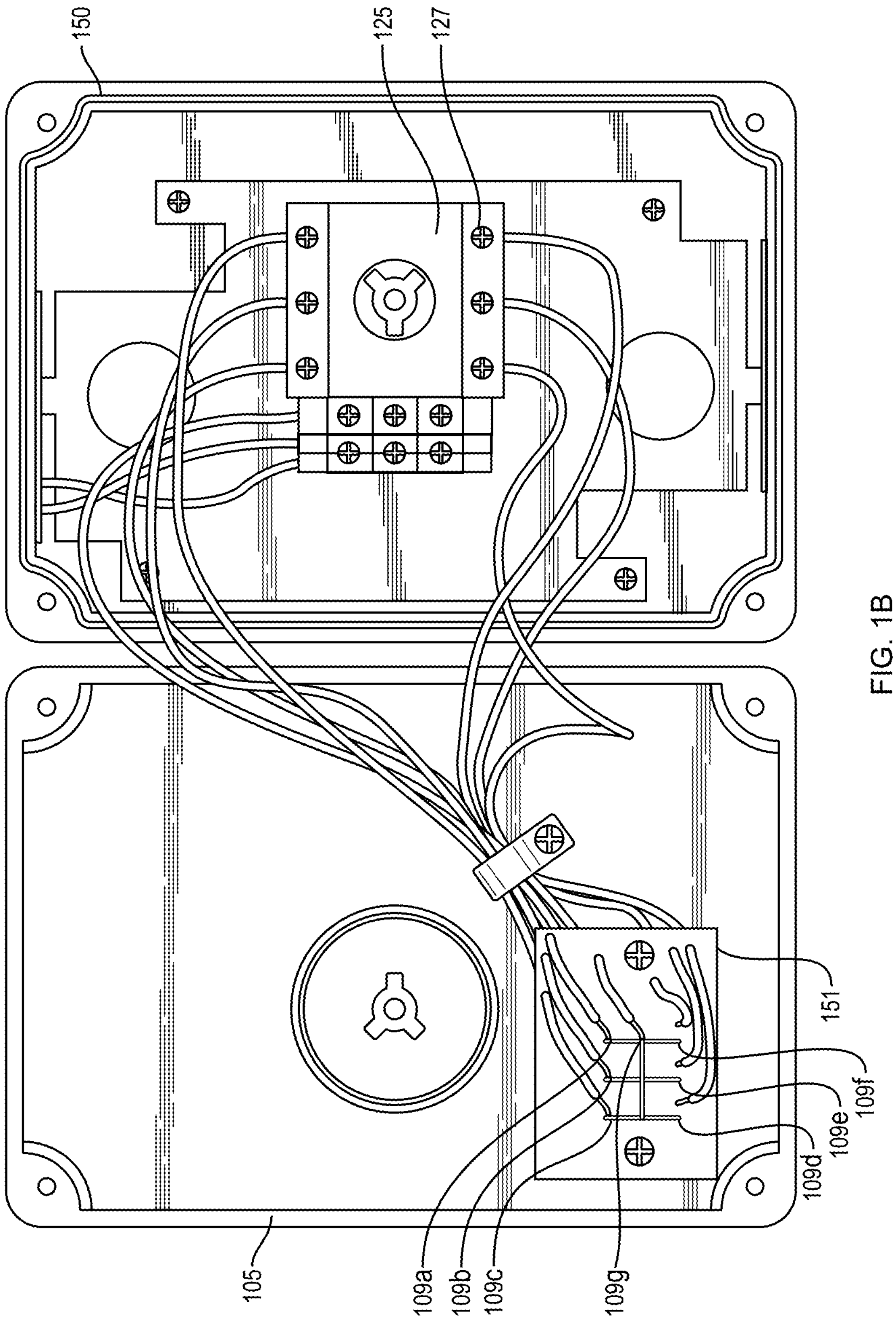
FIG. 1B (PRIOR ART)
FIG. 1B is a view of the manual motor controller of FIG. 1A having the cover open in accordance with the prior art.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Provided herein are power switch assemblies having indicators and a removable cover. In some embodiments, circuit-lock features can also be provided to protect technicians and operators and to comply with OSHA and other regulatory requirements.

As shown in FIGS. 2A-2M, a power switch assembly 200 can include a removable cover 205 attachable to a box 203 to form a power switch enclosure 201.

Figure 2A:
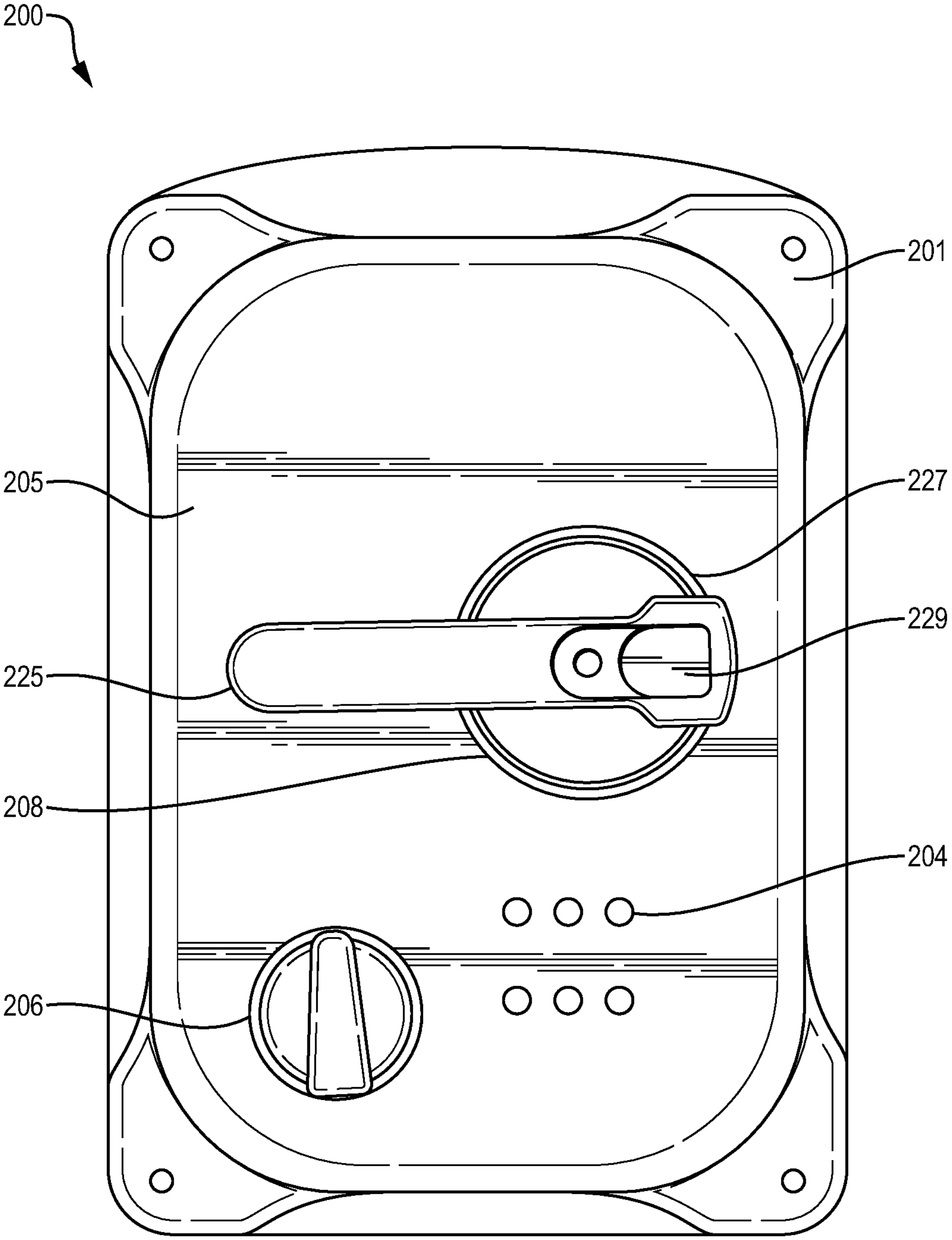
FIG. 2A is an exterior view of a power switch assembly including circuit-lock, indicators, and a power switch enclosure having a removable cover in accordance with various embodiments.
Figure 2B:
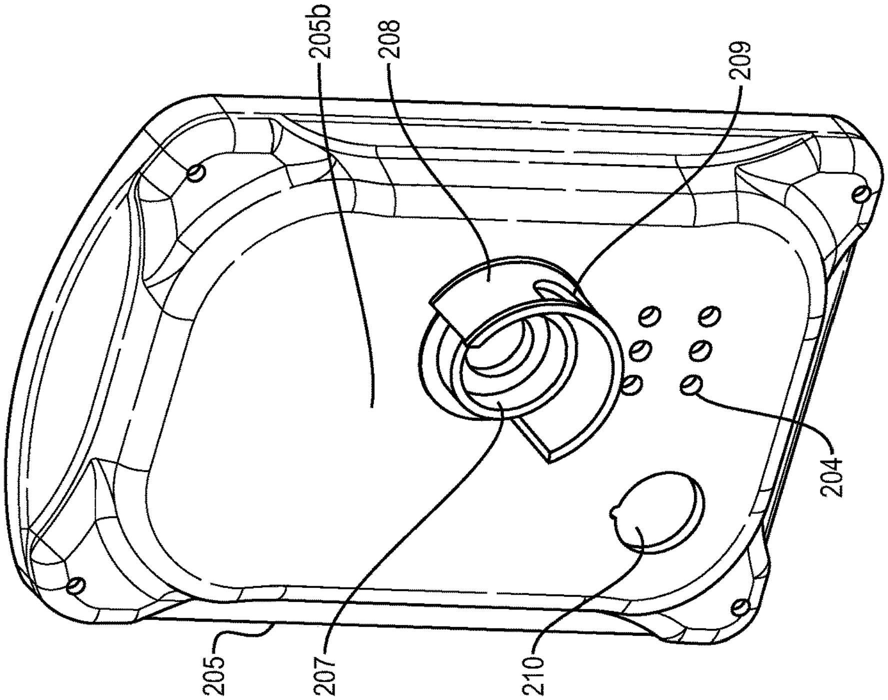
FIG. 2B is an exterior view of the removable cover of the power switch assembly of FIG. 2A in accordance with various embodiments.
Figure 2C:
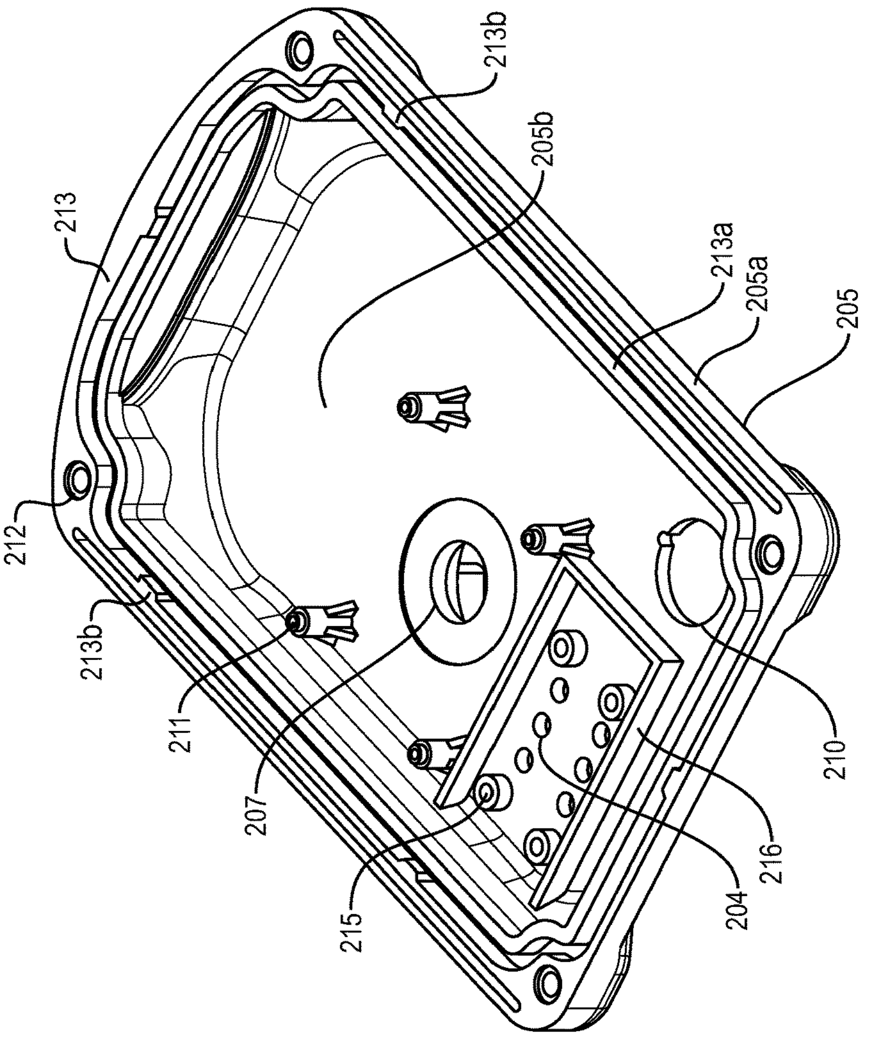
FIG. 2C is an interior view of the removable cover of the power switch assembly of FIG. 2A in accordance with various embodiments.
Figure 2E:
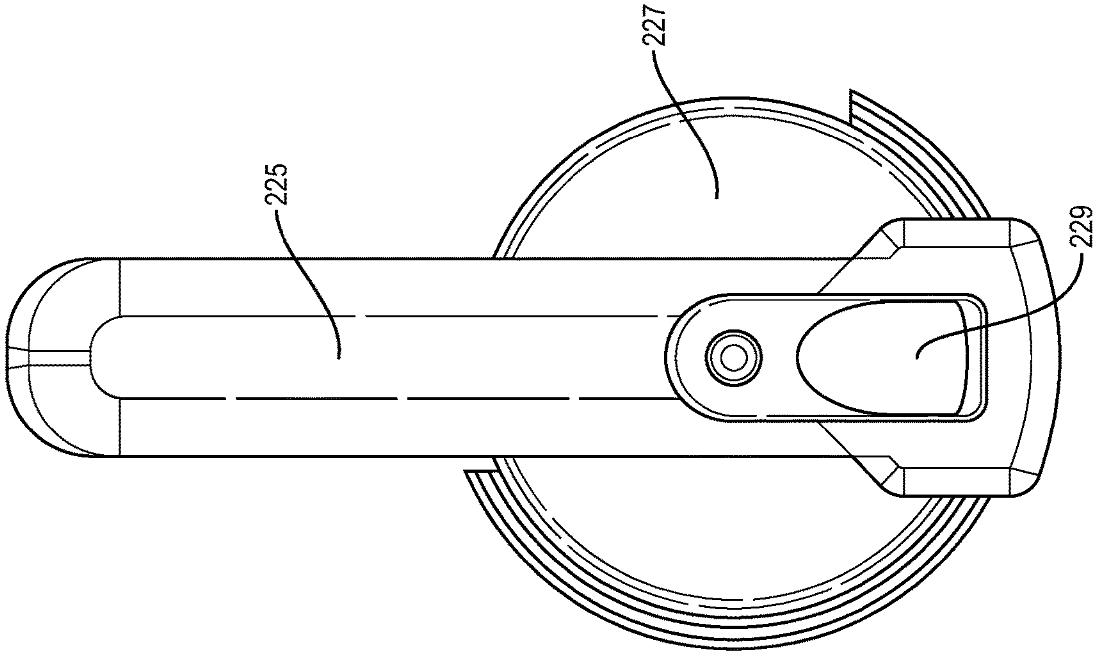
FIG. 2E is a top view of a handle of the power switch assembly of FIG. 2A in accordance with various embodiments.
Figure 2D:
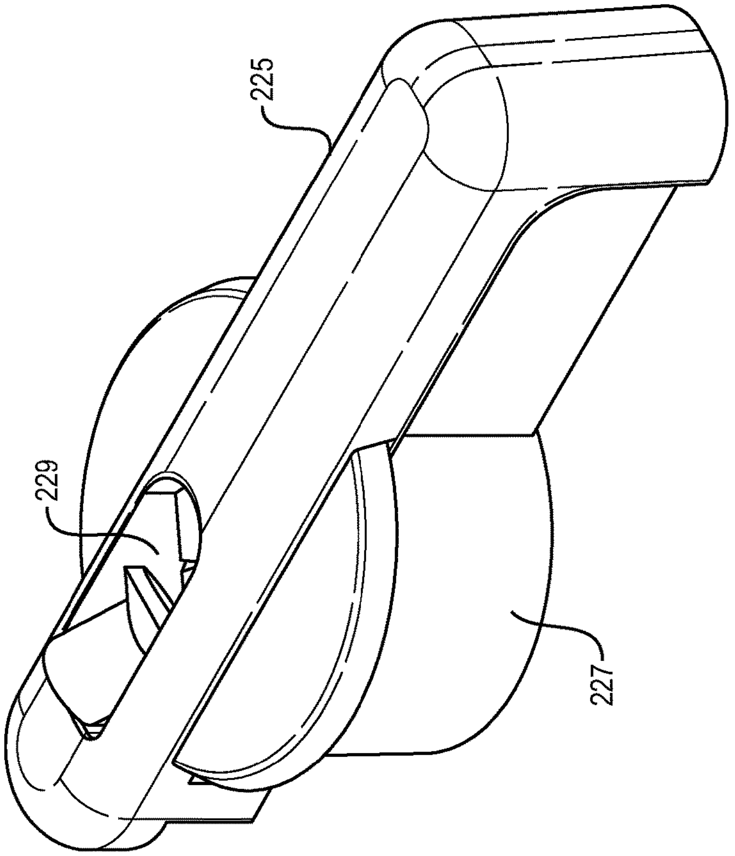
FIG. 2D is an isometric view of a handle of the power switch assembly of FIG. 2A in accordance with various embodiments.
Figure 2F:
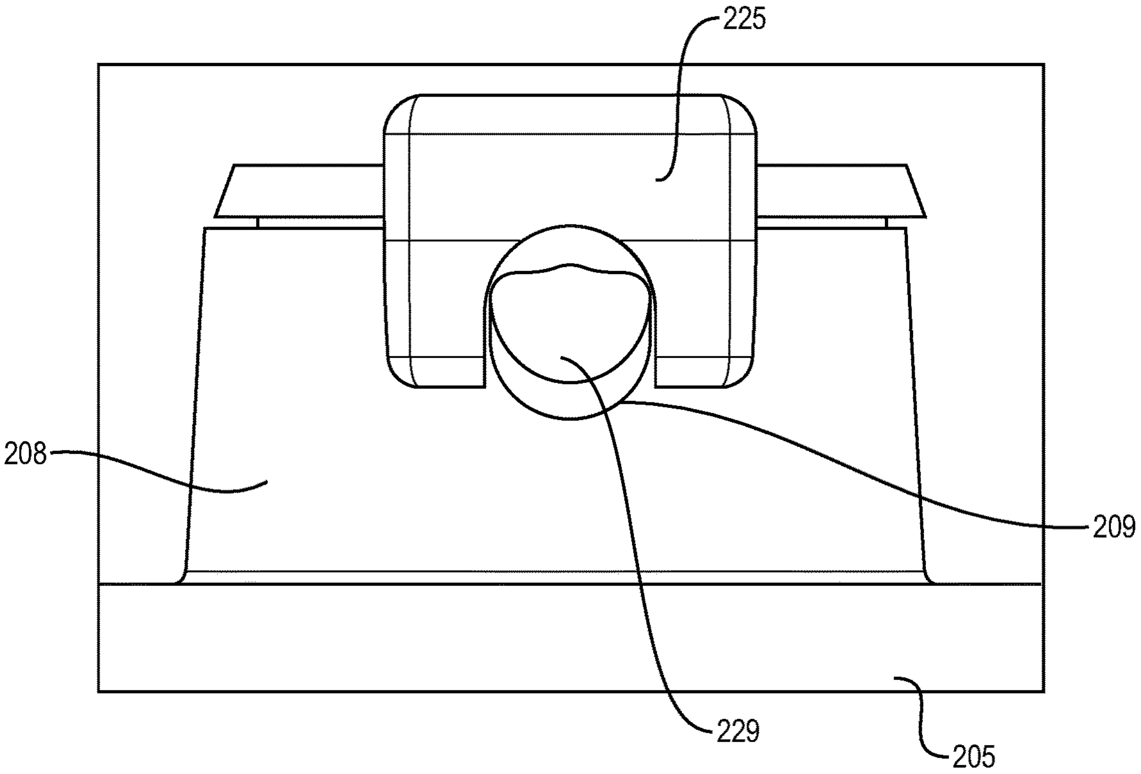
FIG. 2F is a side view of the removable cover having the handle assembled thereto of the power switch assembly of FIG. 2A in accordance with various embodiments.
Figure 2G:
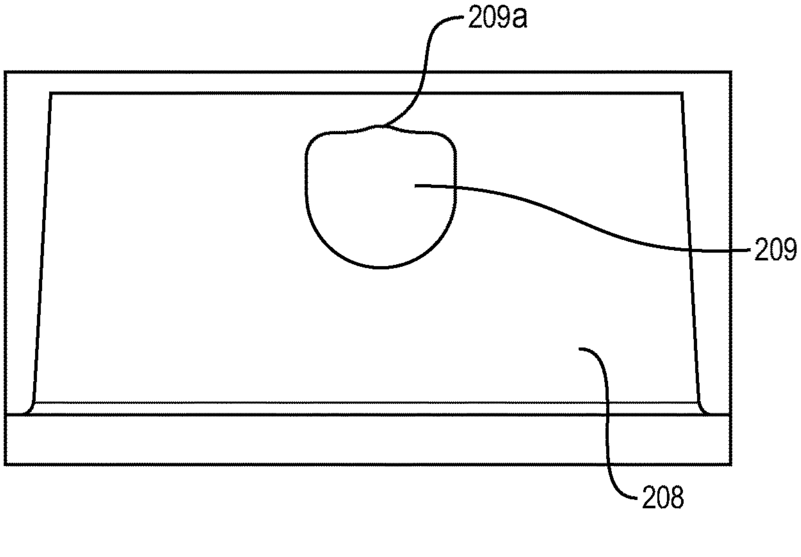
FIG. 2G is a side view of guide collar and lock slot of the power switch assembly of FIG. 2A in accordance with various embodiments.
Figure 2H:
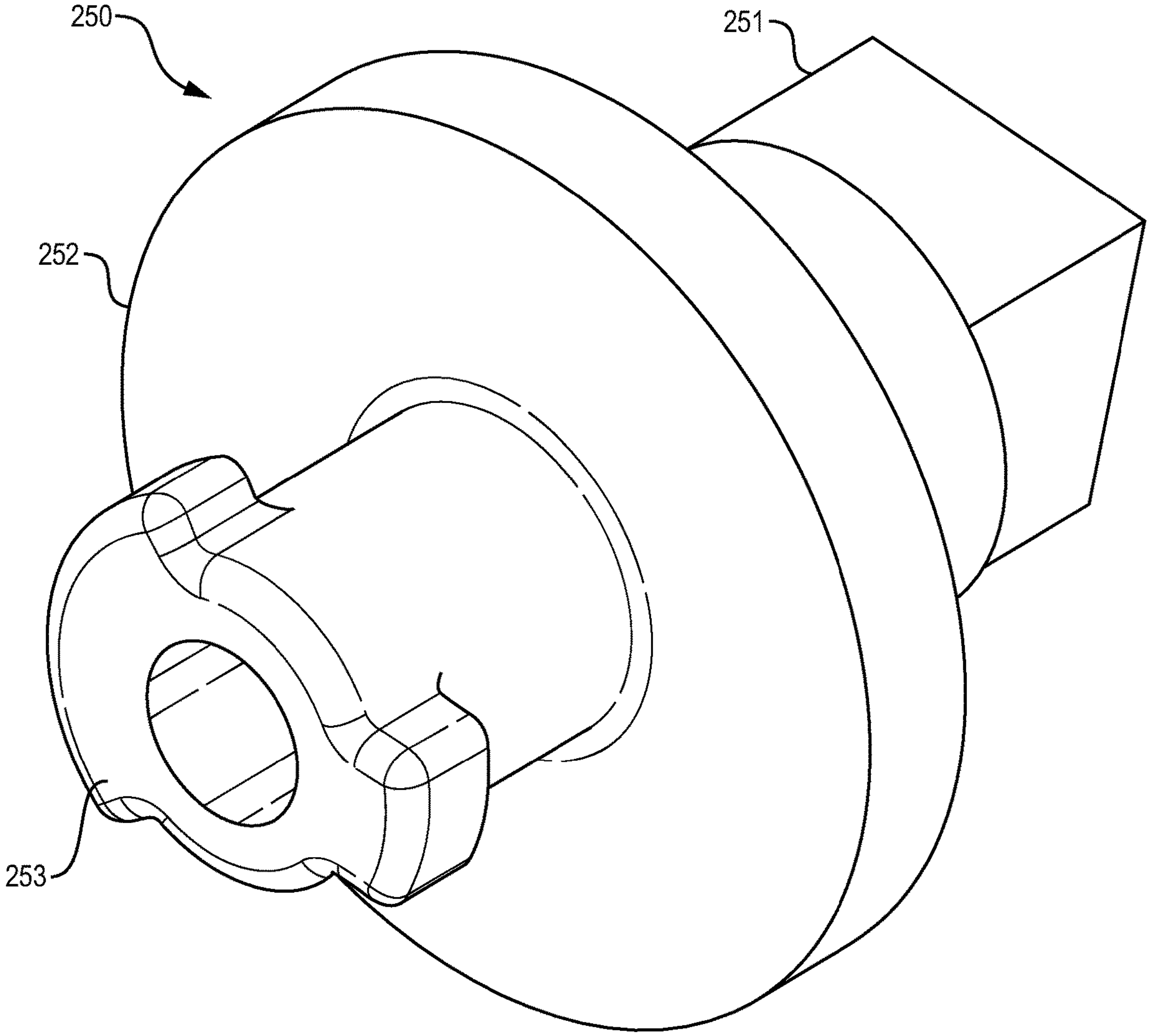
FIG. 2H is an isometric view of a handle shaft of the power switch assembly of FIG. 2A in accordance with various embodiments.
Figure 2I:
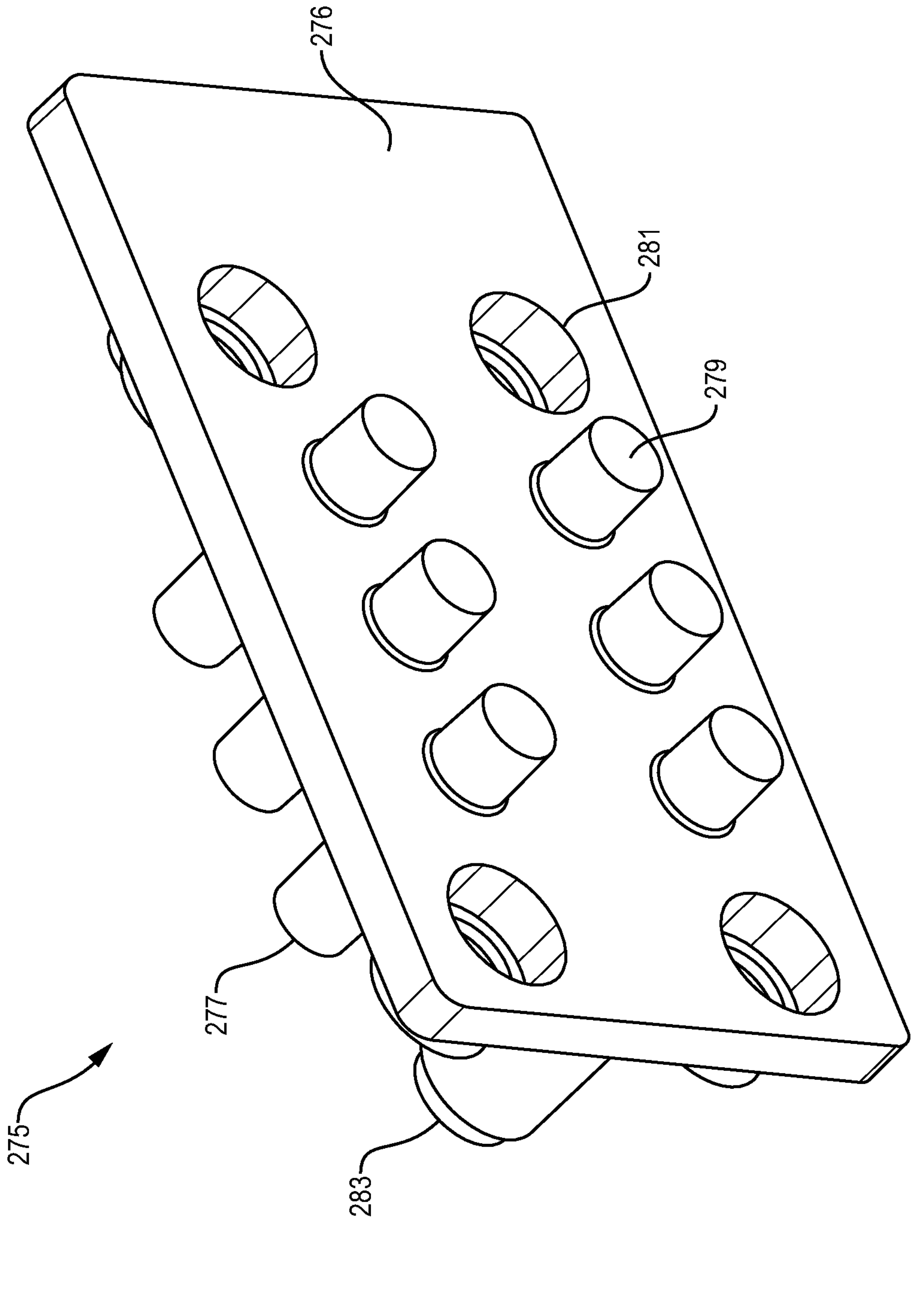
FIG. 2I is an exterior view of molded lens of the power switch assembly of FIG. 2A in accordance with various embodiments.
Figure 2J:
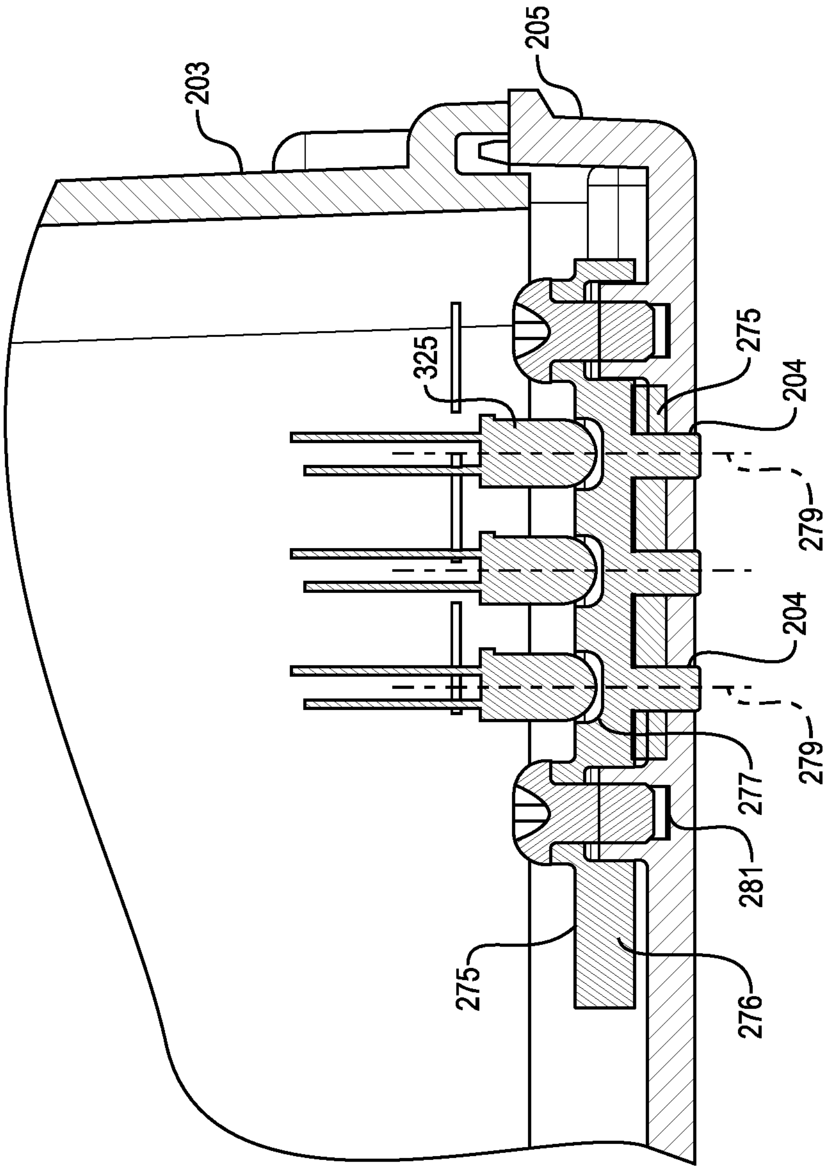
FIG. 2J is a cross-sectional view of the molded lens of FIG. 2I assembled to the removable cover of the power switch assembly of FIG. 2A in accordance with various embodiments.
Figure 2K:
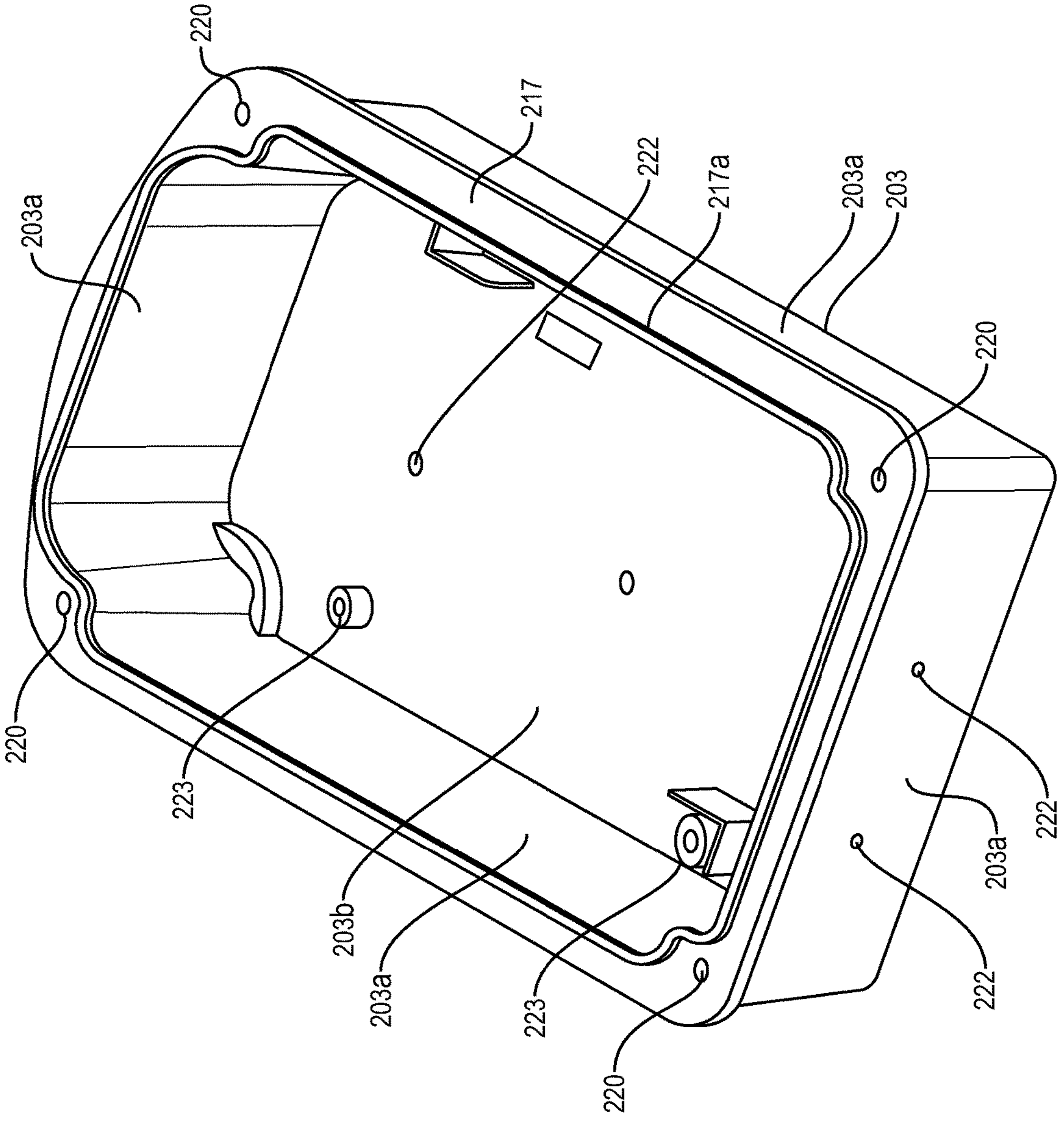
FIG. 2K is an interior view of a box of the power switch enclosure in accordance with various embodiments.

Referring now to FIG. 2K, the box 203 can generally include a box side wall 203*a* extending around a perimeter of a bottom wall 203*b* to define an interior cavity of the box 203. The box 203 can also include a box flange 217 facing opposite the bottom wall 203*b* and extending around the box side wall 203*a*. The box flange 217 can be configured for mating to a cover flange 213 of the removable cover 205 (see FIG. 2C).

The box flange 217 also includes an alignment tab 217*a* extending around and extending upward from the box flange 217. The alignment tab 217*a* can generally be sized for being received into an alignment groove 213*a* formed in the cover flange 213 upon attachment of the removable cover 205 to the box 203. In some embodiments, one or more sealing features (not shown) such as, for example, one or more gaskets, seals, coatings, etc. can be provided in or on at least one of the box flange 217, the alignment tab 217*a*, the cover flange 213, and/or the alignment groove 213*a* to prevent moisture, chemicals, gases, or other environmental elements from entering the power switch enclosure 201 when the cover 205 is assembled to the box 203. In some embodiments, one or more ribs 213*b* can be added inside the alignment groove 213*a* for the retention of alignment tab 217*a* and/or the one or more gaskets, seals, coatings, etc.

Figure 3A:
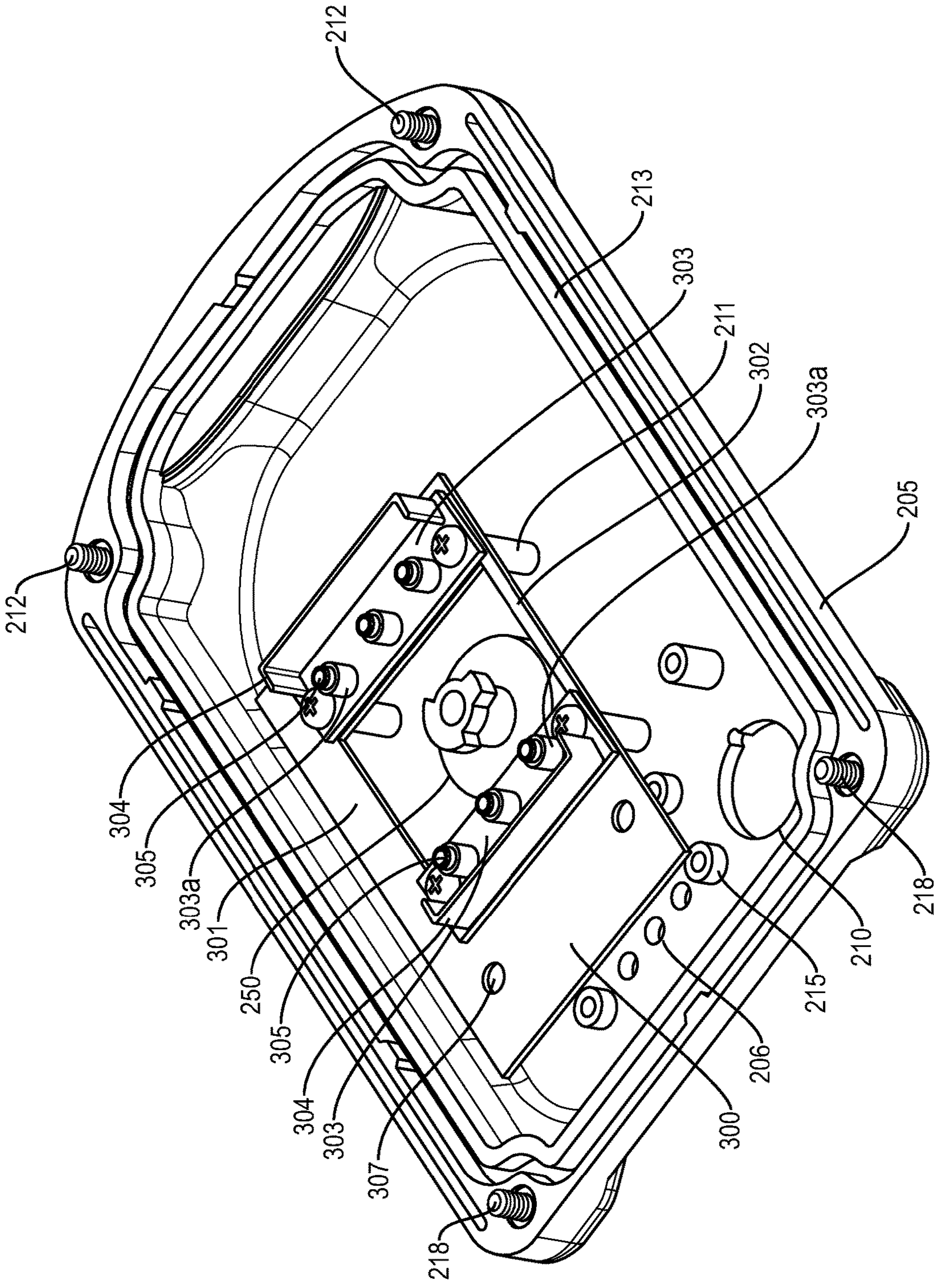
FIG. 3A is an interior view of the removable cover of FIG. 2C having a circuit monitoring indicator board assembled thereto in accordance with various embodiments.

The box flange 217, in some embodiments, can also include one or more threaded box holes 220 defined therein and positioned for alignment with corresponding cover holes 212 extending through the cover flange 213. The threaded box holes 220 can generally be configured to receive enclosure assembly screws 218 (see FIG. 3A) for removable attachment of the cover 205 to the box 203 during assembly. In some embodiments, as shown in FIG. 3A, the cover holes 212 and enclosure assembly screws 218 can be configured such that the assembly screws are captive in the cover holes 212 to prevent loss of the assembly screws 218 upon removal of the cover 205 during servicing or maintenance of the power switch assembly 200.

Figure 2L:
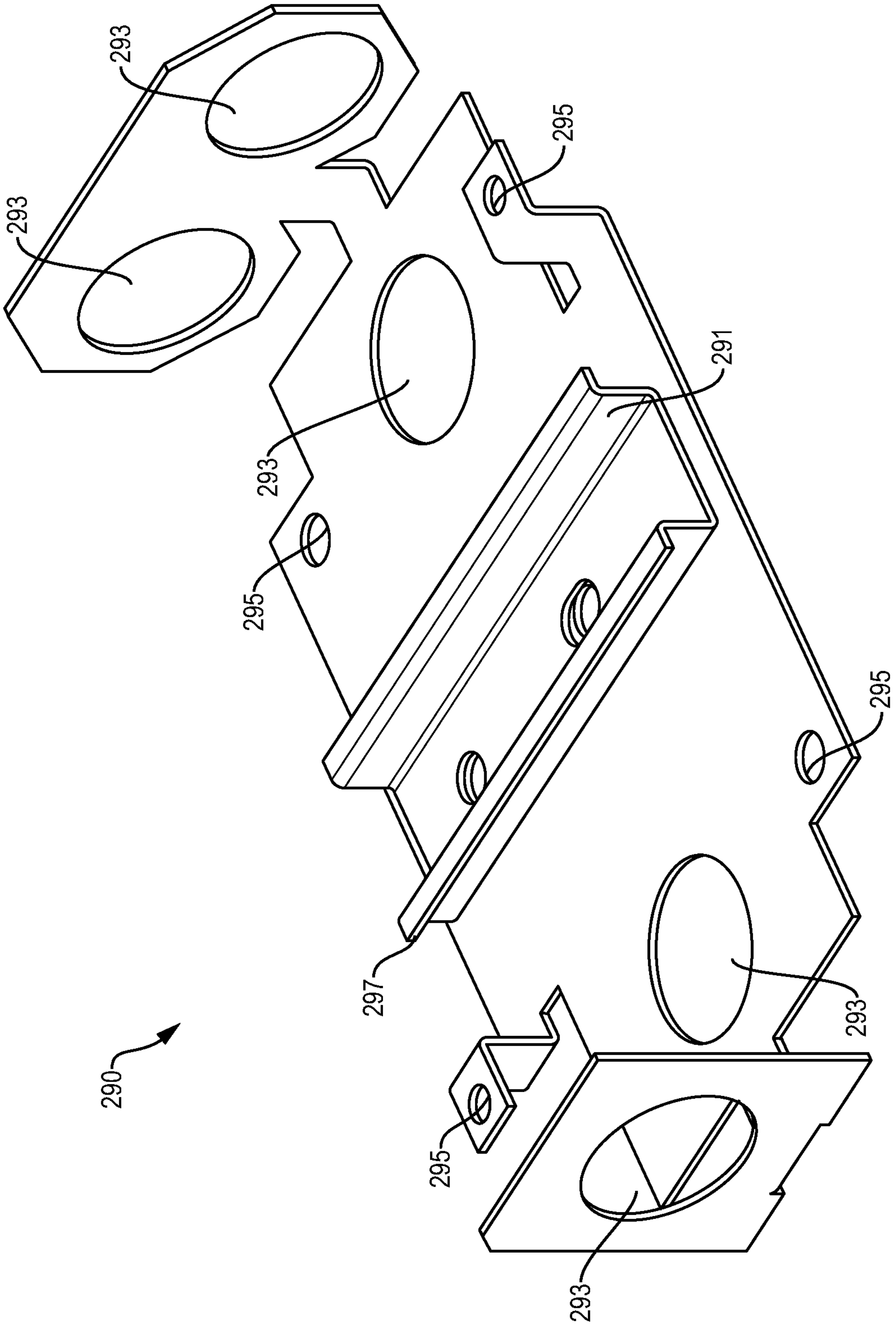
FIG. 2L is an isometric view of a backplate having an attached DIN rail of the power switch assembly of FIG. 2A in accordance with various embodiments.
Figure 2M:
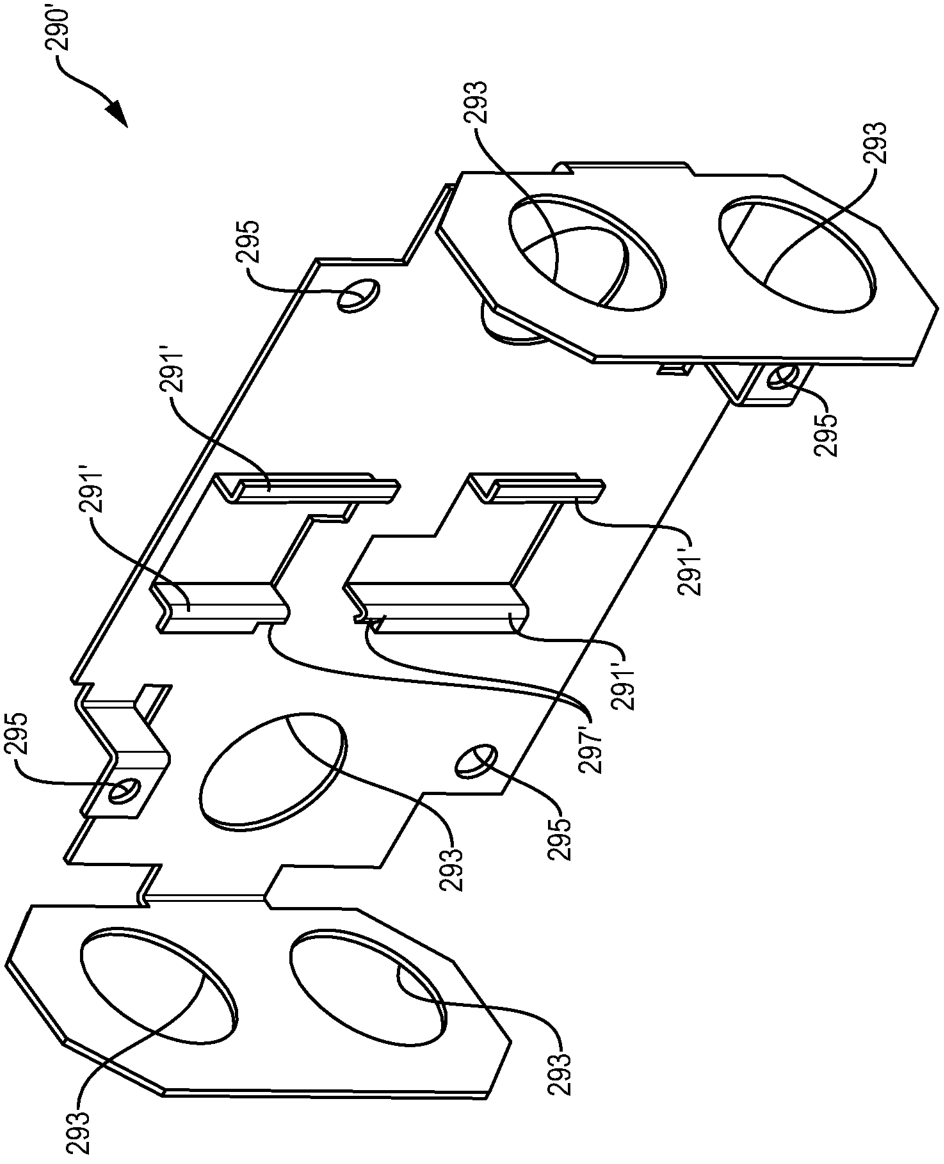
FIG. 2M is an isometric view of a backplate having an integral DIN rail of the power switch assembly of FIG. 2A in accordance with various embodiments.

Referring now to FIGS. 2K, 2L, and 2M, in some embodiments the box 203 can also include one or more threaded backplate standoffs 223 formed and/or positioned on an interior surface of the bottom wall 203*b* for alignment with one or more corresponding backplate assembly holes 295 to facilitate fastening of a backplate 290, 290' thereto. The backplate 290, 290' can be sized and shaped to be positioned within the interior cavity of the box 203 and can include a plurality of conduit entry holes 293 defined therein for permitting ingress of conduit into the box 203.

In some embodiments, the conduit entry holes 293 can be aligned with one or more conduit pilot holes 222 or knockouts (not shown) to guide installation by a technician. It will be apparent in view of this disclosure that, although pilot holes 222 are shown only on the bottom wall 203*b* and two similar locations along the box side wall 203*a*, any number of pilot holes 222 or knockouts can be made at any suitable location along the bottom wall 203*b* and/or the box side wall 203*a* in accordance with various embodiments.

Figure 3B:
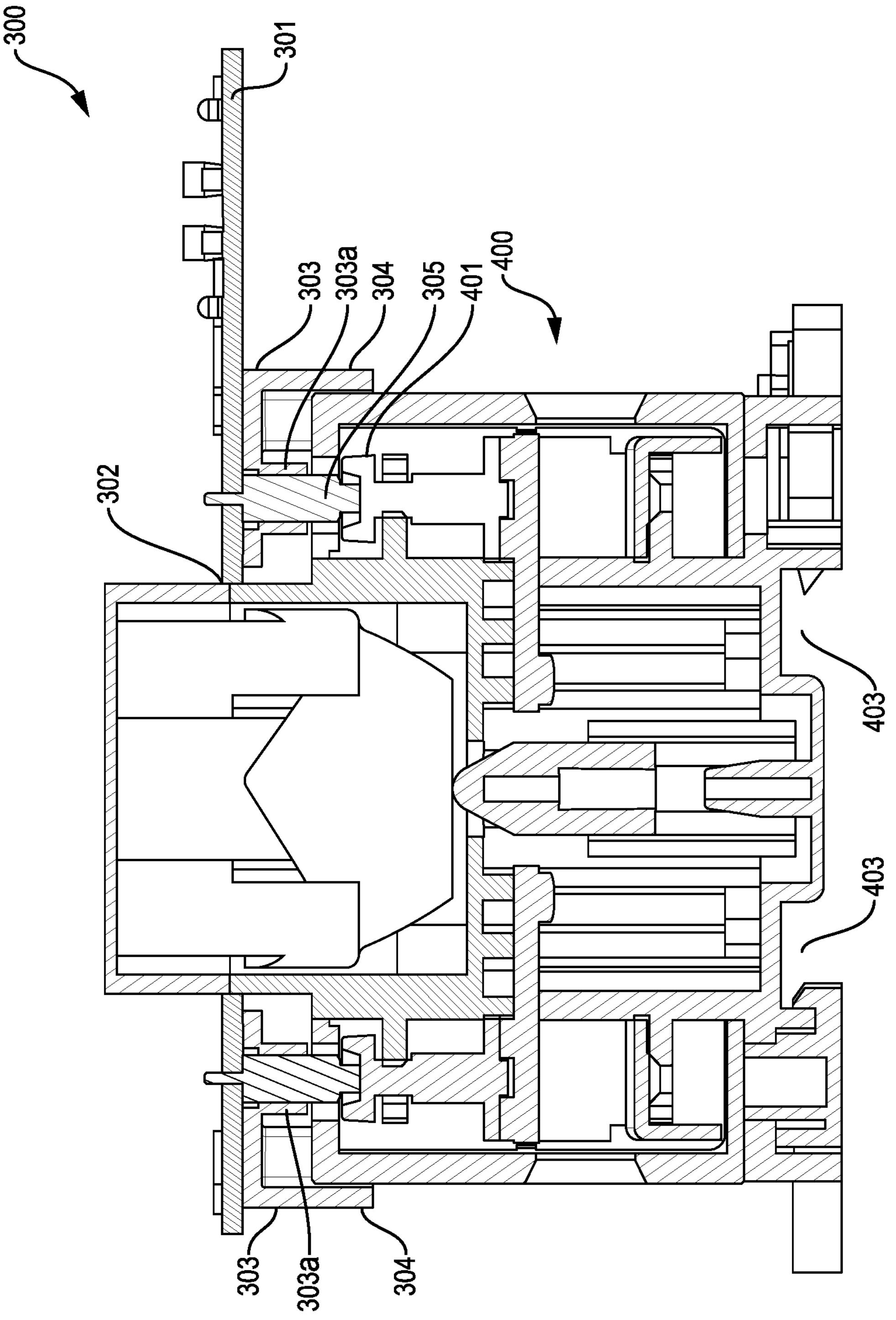
FIG. 3B is a cross-sectional side view of the circuit monitoring indicator board of FIG. 3A connected to a power switch of the power switch assembly of FIG. 2A in accordance with various embodiments.

In some embodiments, the backplate 290 can also include a rail 291, 291' (e.g., a DIN Rail as shown) for mounting of a power switch 400 (see FIGS. 3B, 3D, 3E) thereon. As shown in FIG. 2L, in some embodiments the rail 291 can be a separate element attached (e.g., by spot welding, adhesive, or other means) to the backplate 290 itself. As shown in FIG. 2M, in some embodiments, the rail 291' can instead be integrally formed from the backplate 290' itself. Whether the backplate 290, 290' includes a separate rail 291 or an integral rail 291', one or more notches 297, 297' can be formed at any location along either side of the rail 291, 291'. Such notches 297, 297' can be configured to facilitate installation and/or removal of any installed components (e.g., power switch 400), to fix a precision location of any installed components, or combinations thereof. Additionally, in some embodiments, regardless of whether the backplate 290, 290' includes a separate rail 291 or an integral rail 291', the power switch 400, as shown in FIG. 3B, can include one or more channels 403 configured slidable and/or push-on engagement with the rail 291, 291' for retaining the power switch 400 within the box 203.

It should be noted that, although the power switch assembly 200 is shown and described herein as including a power switch 400 retained in the box 203 by a rail 291, 291' of a backplate 290, 290', in some embodiments, the power switch 400 can be removably attached to the backplate 290, 290' by any other suitable means and/or can be removably attached directly to the interior of the box 203 itself. It will be further apparent in view of this disclosure that, in accordance with some embodiments, the power switch assembly 200 may not include a backplate 290, 290' or may incorporate the backplate as integrally formed within the box 203.

Referring now to FIGS. 2B-2H, the removable cover 205 can generally include a cover side wall **205*a* extending around a perimeter of an upper wall 205*b* to define an interior cavity of the cover 205. The cover flange 213 faces opposite the upper wall 205*b* and extends around the cover side wall 205*a*. The cover flange 213 can be configured for mating to the box flange 217** as discussed above.

The upper wall **205*b* of the cover 205 can include a shaft bore 207 extending therethrough and, in some embodiments, extending perpendicular to and outward from an exterior surface of the upper wall 205*b*. The shaft bore 207 can be sized to receive a handle engagement end 251 of a handle shaft 250 (see FIG. 2H) therethrough such that a flange 252 of the handle shaft 250 abuts an interior surface of the upper wall 205*b* (e.g., as shown in FIG. 3A) and the handle engagement end 251 extends beyond the exterior surface of the upper wall 205*b* to be insertable into a shaft engagement recess (not shown) formed in a barrel 227 of a handle 225 of the power switch assembly 200 on an interior-facing surface of the barrel 227. In some embodiments, the cover 205 can also include a guide collar 208 extending outward from the exterior surface of the upper wall 205*b* and around at least a portion of a circumference of the bore 207 such that, when the handle engagement end 251 of the handle shaft 250 is inserted into the shaft engagement recess of the barrel 227, the barrel 227 is concentrically positioned within the guide collar 208 so as to rotate within the guide collar 208 when the handle 225 is rotated back and forth between an ON position of the power switch assembly 200 and an OFF position of the power switch assembly 200**.

In some embodiments, as best shown in FIGS. 2B and 2D-2G, the guide collar 208 can also include a lock slot 209 formed in the guide collar 208 at a position wherein the lock slot 209 is aligned with a lock passage 229 of the handle 225 when the handle 225 is in an OFF position of the power switch assembly 200 to permit locking of the power switch 400 and the handle 225 in the OFF position during maintenance, servicing, or, more generally, any time it is desirable for the power switch assembly 200 to be OFF. This "circuit-lock" feature improves safety for technicians, operators, or would-be operators and is compliant with OSHA lockout/tagout requirements. In some embodiments, as shown in FIG. 2G, the lock slot 209 can include one or more notches **209*a* to facilitate easier insertion of a locking mechanism. More generally, hole geometry of the lock slot 209 and handle passage 229 should permit compatibility with different sizes of locks so as to permit those locks to pass thru the handle passage 229 and the lock slot 209** to lock out the switch during out-of-service activities or incidents.

Furthermore, referring now to FIG. 2H, for added safety, a switch engagement end 253 of the handle shaft 250 is configured for twist-and-lock engagement with the power switch 400 such that, when the switch engagement end 253 is inserted into and engaged with the power switch 400, the cover 205 is only removable when the handle 225 is in the OFF position of the power switch assembly 200. Thus, it is impossible to inadvertently remove the cover 205 or open the enclosure 201 while the power switch 400 remains on.

Referring again to FIGS. 2A-2C, in some embodiments, the removable cover 205 can optionally include a jog switch aperture 210 for receiving a jog switch 206 therethrough. The jog switch 206 can generally be wired to provide low speed or "inching" functionality of the controlled motor(s), which is generally used to index a connected machine into a desired position.

The removable cover 205 can also include one or more indicator apertures 204 defined in the upper wall **205*b* for permitting one or more circuit monitoring indicators to provide an indication therethrough. Such indicator apertures 204 can include lens apertures as shown in FIGS. 2A-2C and 2J, which are useful for LED or other light-emitting indicators. However, it will be apparent in view of this disclosure that indicator apertures 204, in accordance with various embodiments can include any type of apertures suitable for any other type of indicator. For example, in some embodiments the indicator apertures 204 can include lens apertures, apertures for permitting transmission of sound or accommodation of a speaker or other auditory indicating element for use with auditory indicators, apertures for accommodating one or more displays or screens such as digital displays or touchscreens, buttons for operation of an interactive display or screen, any other suitable indicator aperture 204**, or combinations thereof.

Referring to FIGS. 2C, 2I, and 2J, the cover 205 also includes one or more threaded lens mount standoffs 215 formed on an interior surface of the upper wall **205*b* and configured to receive attachment screws extending through cover mounting holes 281 of a lens device 275 to fasten the lens device 275 to the cover 205 on the interior surface of the upper wall 205*b*. In some embodiments, the cover 205 can optionally include a retention wall 216 formed on the interior surface of the upper wall 205*b* and configured to receive the lens device 275 therein. In this manner, the retention wall can aid with aligning the lens device 275 with the lens mount standoffs 215 and the lens apertures 204 as well as aiding retention of the lens device 275 on the cover 205**.

Referring now to FIGS. 21 and 2J, in some embodiments, the lens device 275 can include a base 276 having a plurality of lens elements 279 extending from a first side thereof for insertion into and at least partially through the indicator apertures 204 (lens apertures as shown). For each lens element 279, the lens device 275 also includes a corresponding lightguide 277 extending from a second side of the base 276 opposite the corresponding lens element 279 and toward one or more LEDs 325 located within the interior cavity of the removable cover 205 such that at least one of the LEDs 325 is positioned to transmit light through a corresponding one of the lightguides 277 and its corresponding lens element 279. In some embodiments the lens device 275 also includes one or more lens-circuit standoffs 283 for providing structural support to and/or additional attachment points for a circuit board 301 of a monitoring and indication circuit 300 (hereinafter "monitor circuit" for brevity).

Referring to FIGS. 2C and 3A, the removable cover 205 can include one or more threaded circuit standoffs 211 formed on and extending outward from the interior surface of the upper wall 205*b* of the cover 205 for attachment to the circuit board 301. As shown in FIG. 3A, the circuit standoffs 211 can be internally threaded "female" standoffs for receiving assembly screws therein to hold the circuit board 301 in a fixed position relative to the cover 205. Alternatively, in some embodiments, as shown in FIGS. 3D and 3E, circuit standoffs 211' can be externally threaded "male" standoffs configured to thread into a nut. In such embodiments, the circuit board 301 may have a fixed position relative to the cover 205 as shown in FIG. 3E or, as shown in FIG. 3D, may optionally include one or more compression springs 297 to provide pressure outward from the interior surface of the upper wall 205*b* in order to help maintain contact (or another suitable electrical connection) between connectors 305 and one or more terminals 401 (e.g., terminal screws as shown) of the power switch 400. It should be noted that, as used herein, "terminal" refers to both true terminals and to terminal conductors. For example, the terminal screws depicted as terminal 401 in FIGS. 3B, 3D, 3E are not, strictly speaking, "terminals" of the power switch 400 in the most technically specific sense of the term. They are instead conductive elements in electrical contact with those terminals, which, for clarity and simplicity, we refer to as "terminals".

In any arrangement, the standoffs 211, 211', circuit board 301, and any additional positioning elements such as compression springs 297 can be selected according to a size and type of the connectors 305 to provide a suitable electrical connection between each respective connector 305 and terminal 401. For example, in some embodiments (e.g., in the embodiment of FIG. 3A), the need for compression springs 297 is obviated by the use and proper sizing of spring-loaded pins as the connectors. Thus, the spring functionality is achieved, in some embodiments, by the use of larger/longer connectors 305 having a longer longitudinal travel in order to accommodate a wider fit tolerance. Alternatively, the use of compression springs 297 to adjust the entire circuit board 301 may obviate the need for spring-loaded pins and permit the use of simpler, conventional metal point-contact pins as the connectors 305. More generally, it will be apparent in view of this disclosure that, should a pin or other physical contact connector be selected, any size or style of connector 305 having any length range and total longitudinal travel (including none) can be used in accordance with various embodiments.

In addition, although the connectors 305 shown and described herein are depicted as spring-loaded pins configured for physical contact with one or more terminal screws of the power switch, it will be apparent in view of this disclosure that, where physical contact between the connectors 305 and the power switch 400, any suitable contact can be used, such as, for example, spring-loaded pins, fixed point-contact pins, lever contacts, leaf spring contacts, HDMI, USB, USB-C, Lightning, or any other suitable physical contact or connector. In such embodiments the terminals/terminal conductors 401, instead of conventional terminals or terminal screws, may include, for example, complementary lever, leaf spring, HDMI, USB, USB-C, Lightning contacts, conductive plates, or other suitable physical contacts.

Furthermore, not all connectors 305 contemplated herein require physical contact with a terminal 401 of the power switch 400. For example, in some embodiments, connectors 305 can include non-contact connectors or sensors such as, for example, hall effect sensors, field sensors, Rogowski coils, iron-core current transformers (CT) (e.g., as described below with reference to FIG. 5), or any other suitable non-contact connector. In such embodiments the terminals/terminal conductors 401, instead of conventional terminals or terminal screws, can include one or more suitable terminal conductors, complimentary conductive plates, coils, sensors, or other suitable elements.

Referring still to FIGS. 3A and 3B, the monitor circuit 300 includes the circuit board 301 having opposing first and second sides. The circuit board 301, can be mounted on and attached at the Circuit standoffs 211 and/or the lens-circuit standoffs 283 as discussed above such that the first side substantially faces the upper wall 205*b* and the second side faces substantially away from the upper wall 205*b*. The circuit board 301 can include any suitable circuit board 301 including, for example, a printed circuit board (PCB) as shown and can include a power switch aperture 302 defined therein to permit passthrough of the power switch 400 and/or the handle shaft 250.

Figure 3C:
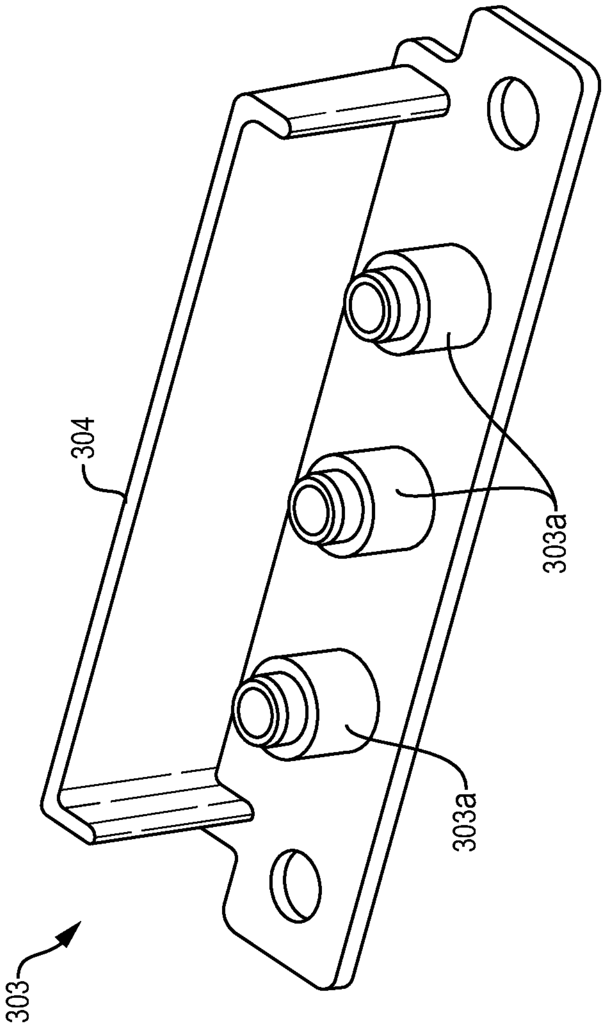
FIG. 3C is an isometric view of an alignment bracket in accordance with various embodiments.
Figure 3D:
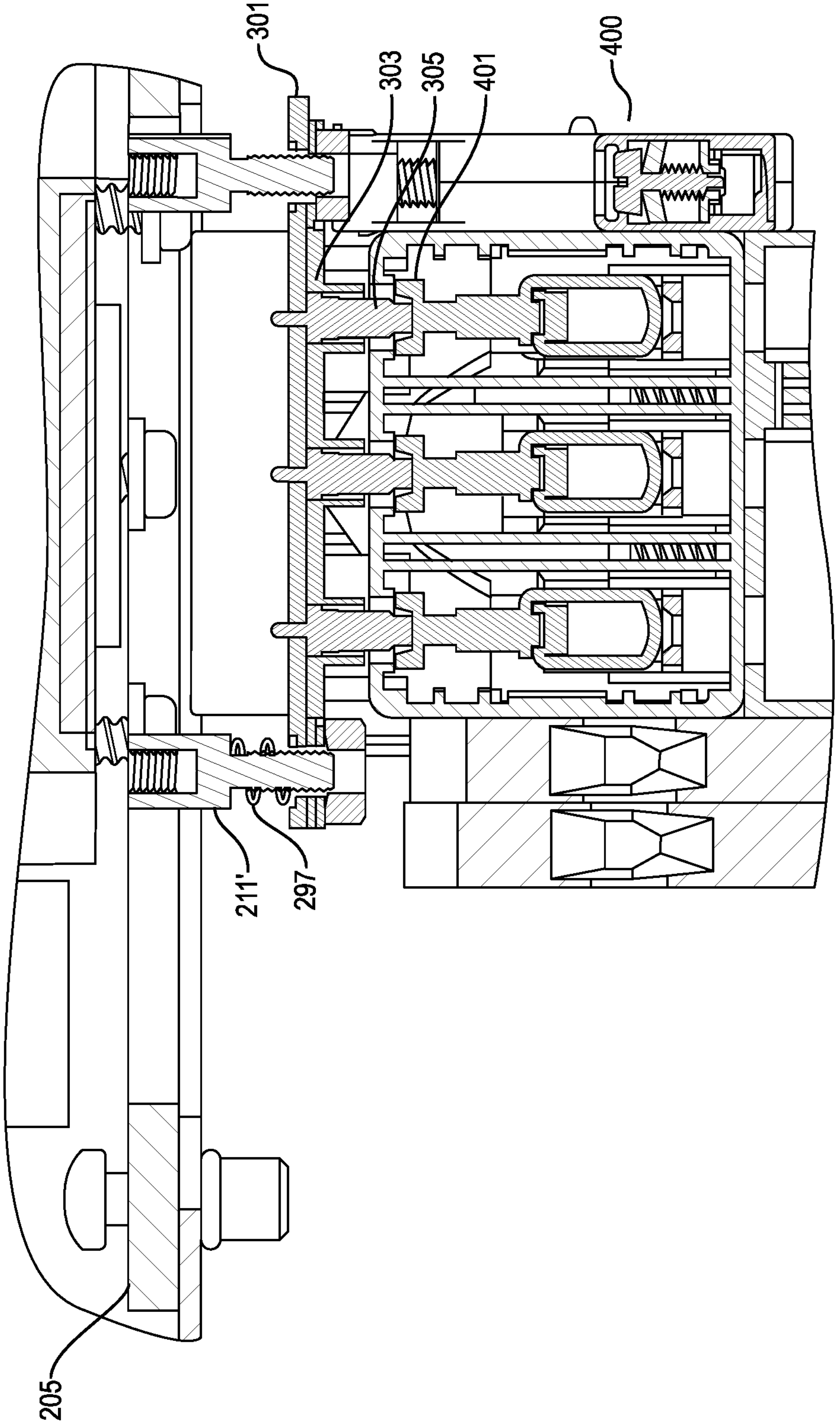
FIG. 3D is a partial front cross-sectional view of a circuit monitoring indicator board of assembled to the removable cover by male threaded standoffs and compression springs and connected to the power switch in accordance with various embodiments.
Figure 3E:
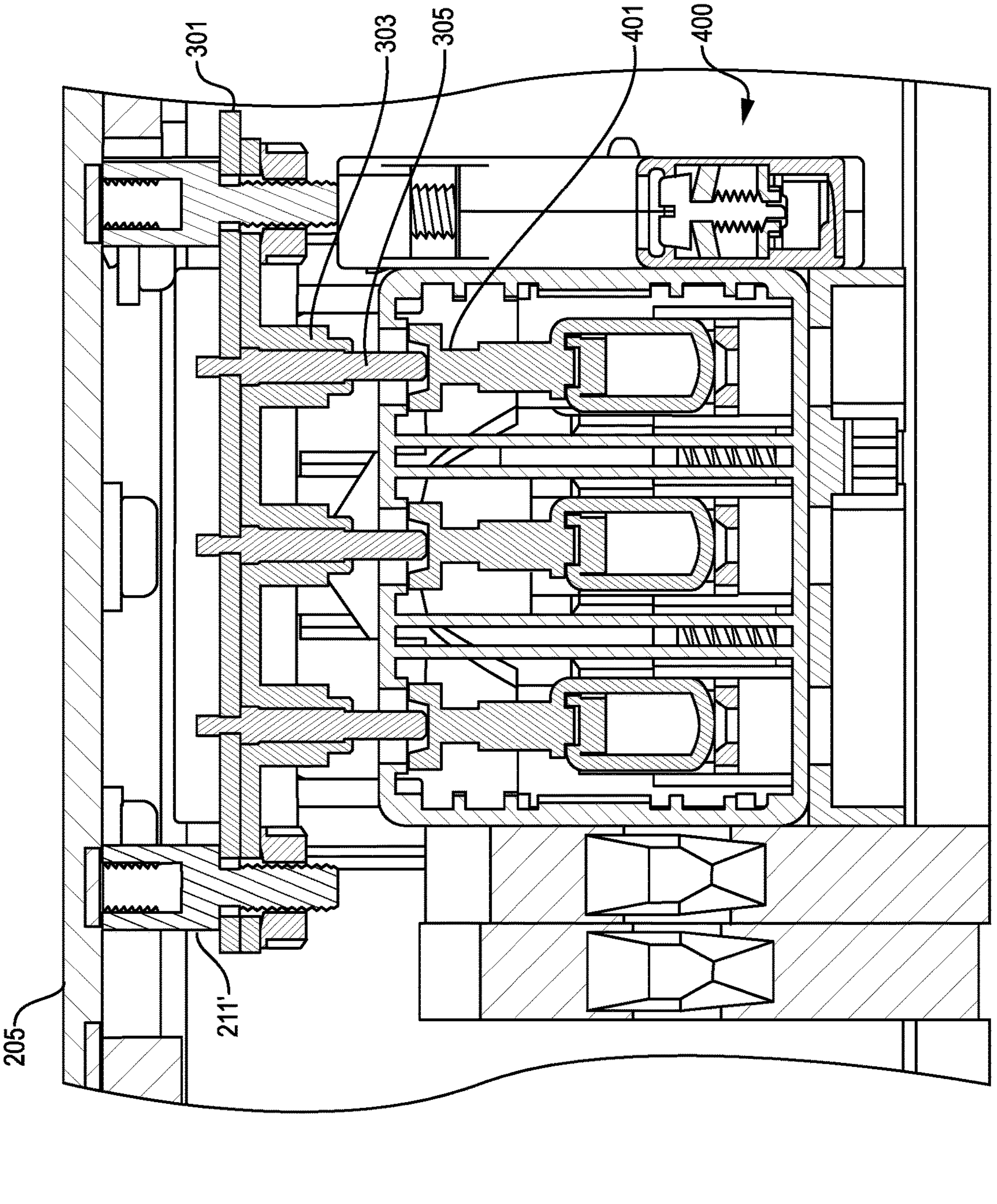
FIG. 3E is a partial front cross-sectional view of a circuit monitoring indicator board of assembled to the removable cover by male threaded standoffs without compression springs and connected to the power switch in accordance with various embodiments.

As best shown in FIGS. 3A-3C, the monitor circuit 300 can also include first and second alignment brackets 303 mounted to the second side of the circuit board 301 in opposing arrangement proximate opposing sides of the power switch aperture 302. Each bracket 303 includes one or more connector supports 303*a*, each extending from the second side of the circuit board 301 and permitting a connector 305 to extend from the second side of the circuit board 301 and through a respective one of the connector supports 303*a* toward the power switch 400. For example, as shown in FIG. 3A, each bracket 303 includes three connectors 305 extending through three connector supports 303*a*, consistent with a three-phase switch arrangement. However, it will be apparent in view of this disclosure that any number of connectors 305 and/or any number of brackets 303 having any number of bracket supports 303*a* can be used in any suitable arrangement in accordance with various embodiments, according to the size, shape, type, or other characteristics of a particular power switch. In accordance with various embodiments, the bracket supports 303*a* can generally be sized and configured to provide structural support and/or electrical insulation for the connectors 305 passing therethrough.

Each bracket 303 also includes a guide surface 304 extending outward from the second side of the circuit board 301 and positioned, as shown in FIG. 3B, to slide over an exterior surface of the power switch 400 to align the connectors 305 with the power switch 400 and, by extension, the terminals 401 of the power switch 400. In this manner, when the removable cover 205 is attached to the box 203, the connectors 305 are brought into contact with the terminals 401, providing power to the monitoring and indication circuitry of the monitor circuit 300.

Referring now to FIGS. 4A-4H, the monitor circuit 300, on the circuit board 301, can also include a plurality of circuit elements including, for example, LEDs 325, corresponding diodes 327 (e.g., Zener diodes as shown), and a plurality of resistors 329 as needed to provide monitoring and indication functionality. Although shown and described herein as having circuit elements (e.g., LEDs 325, diodes

327, resistors 329) on a first side of the circuit board 301 and the connectors 305 on a second side of the circuit board 301, it will be apparent in view of this disclosure that, so long as the connectors 305 are positioned to contact the terminals 401, any of the various other elements of the monitor circuit 300 (e.g., LEDs 325, diodes 327, resistors 329) can be arranged at any location on either side of the circuit board 301 in accordance with various embodiments. It will be further apparent in view of this disclosure that the monitor circuit 300 is not limited to the functionalities and circuitry shown herein. For example, monitor circuits 300 in accordance with various embodiments may include one or more of any of LEDs 325, diodes 327, resistors 329, microcontrollers, integrated chips, microprocessors, power monitoring circuitry, display elements (e.g., digital displays, screens, touch screens), auditory elements (e.g., sirens, speakers, alarms and/or horns for producing auditory status signals, spoken messages, alarms, sirens, tones, and/or warnings), communications equipment (e.g., circuitry for Wi-Fi, Bluetooth, Bluetooth low energy, ZigBee, cellular connections, RS485, ethernet, transceivers, receivers, transmitters, signal processing equipment, or any other suitable communications equipment), or combinations thereof.

Such additional circuit elements can facilitate additional functionality of the monitor circuit such as monitoring voltage, frequency, power level, power transmission signal characteristics and/or changes thereto over time, power consumption, power failures, power surges, out of tolerance power conditions, or other system analytics and health monitoring, detection of failures and/or dangerous conditions, any other desired system monitoring, or combinations thereof. Furthermore, the provision of communications equipment can permit such monitoring data and indicators to be electronically provided externally to the monitor circuit 300 and the power switch assembly 200 in order to facilitate and inform system data collection and analytics as well as to provide indications and/or warnings to users not physically present at the switch. In some embodiments, the monitor circuit 300 may even include circuitry for operating the power switch 400 remotely.

Figure 5:
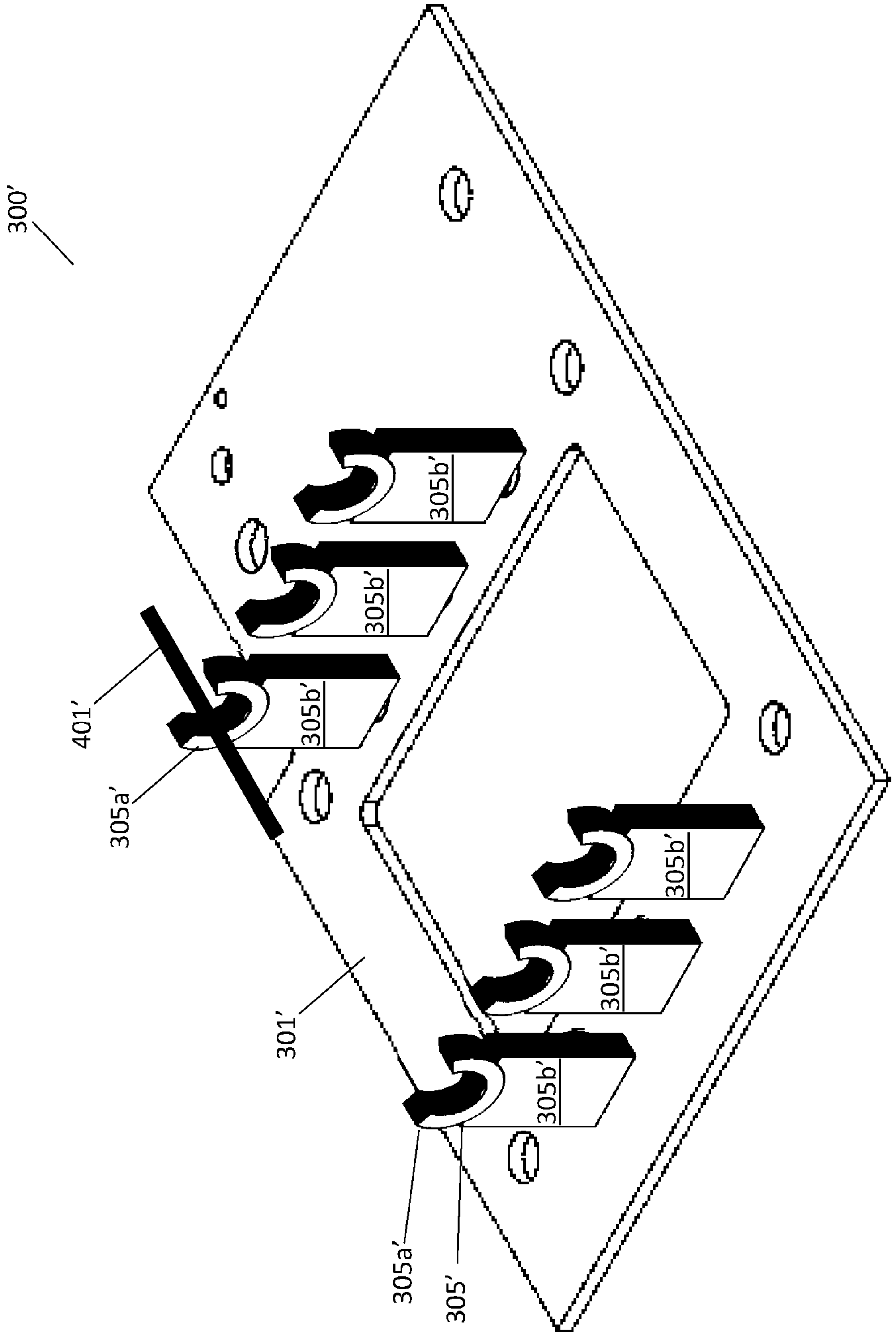
FIG. 5 is a lower rear isometric view of an exemplary circuit monitoring indicator board wherein the connectors include Rogowski coils or iron-core current transformers (CT) in accordance with various embodiments.

Referring now to FIG. 5, in some embodiments, instead of connectors 305 that are pins, a monitor circuit 300' can include connectors 305' including at least one of a Rogowski coil or iron-core current transformer (CT) 305*a*' which, in some embodiments, can be either directly mounted on circuit board 301' or can be mounted atop one or more posts 305*b*', which can include any suitable structure including, for example, another circuit board (e.g., a PCB) oriented perpendicular to the circuit board 301', a standoff extending from the circuit board 301', a pin extending from the circuit board 301', a conductive pole extending from the circuit board 301', or any other suitable structure. Each Rogowski coil or CT 305' can, in some embodiments, be substantially crescent-shaped, arced, or circular and can be oriented for forming a non-contact electrical connection and/or interaction with a terminal conductor 401' of a power switch upon assembly of the cover 205 to the box 203. Suitable terminal conductors 401' can include, for example, rods or wires in electrical communication with a terminal of the power switch. Such non-contact connectors 305' and terminal conductors 401' can be configured, for example, to monitor and/or measure current, capacitively coupled voltage, any other suitable monitoring function as discussed above, or combinations thereof.

Figure 6A:
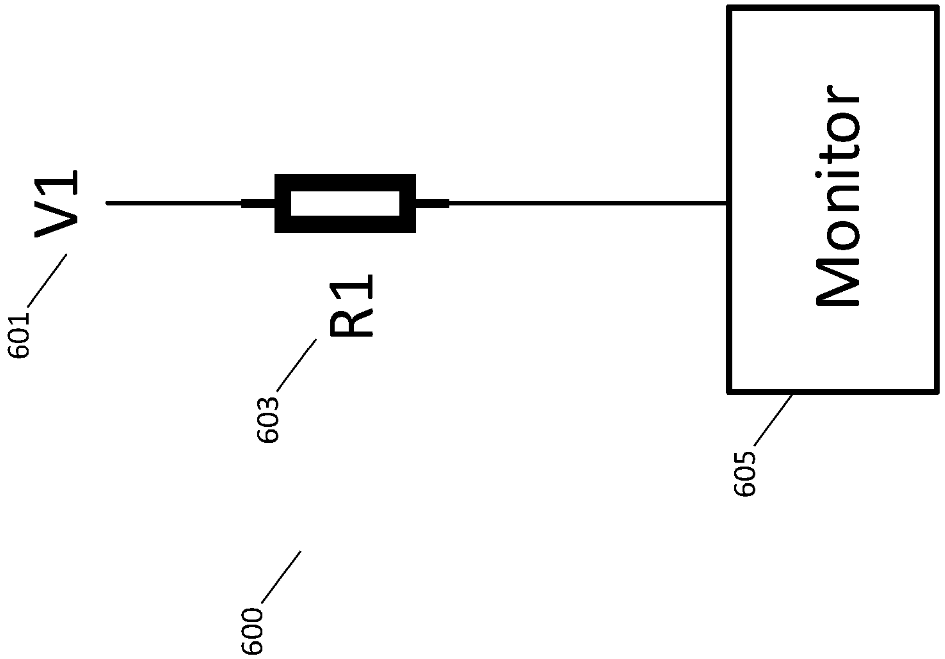
FIG. 6A is a schematic illustration of circuitry for monitoring source voltage in accordance with various embodiments.

As shown in FIG. 6A, monitor circuitry 600 generally includes a connection to a monitored power source 601, one or more monitor blocks 605, and, depending on the type of monitor block 605 and other circuit elements of the monitor circuitry 600, at least one resistor 603 divider. The design of the monitor block 605 varies according to the particular characteristics of the voltage source (e.g., AC/DC, single-phase, three-phase) and preferred type of indication. For example, although shown and described herein in the context of LED circuits, it will be apparent in view of this disclosure that monitor blocks 605 and/or the monitor circuitry 600 more generally can also include comparator circuits, microcontrollers, LED circuits, any of the other circuit elements of the monitor circuit 300 discussed above, or combinations thereof in order to provide any of the functionalities of the monitor circuit 300 discussed above. In the exemplary embodiments shown in FIGS. 6B-5D, the monitor blocks 605', 605", 605'" are configured to monitor voltage characteristics of the power source 601 and use LEDs as an indicator. Furthermore, if any of those monitor blocks 605', 605", 605' is returned to PE (earth ground) as shown, for example, in connection with monitor circuitry 675 of FIGS. 6D and 7, the monitor circuitry 600 can be used to check ground continuity as well.

Figure 6B:
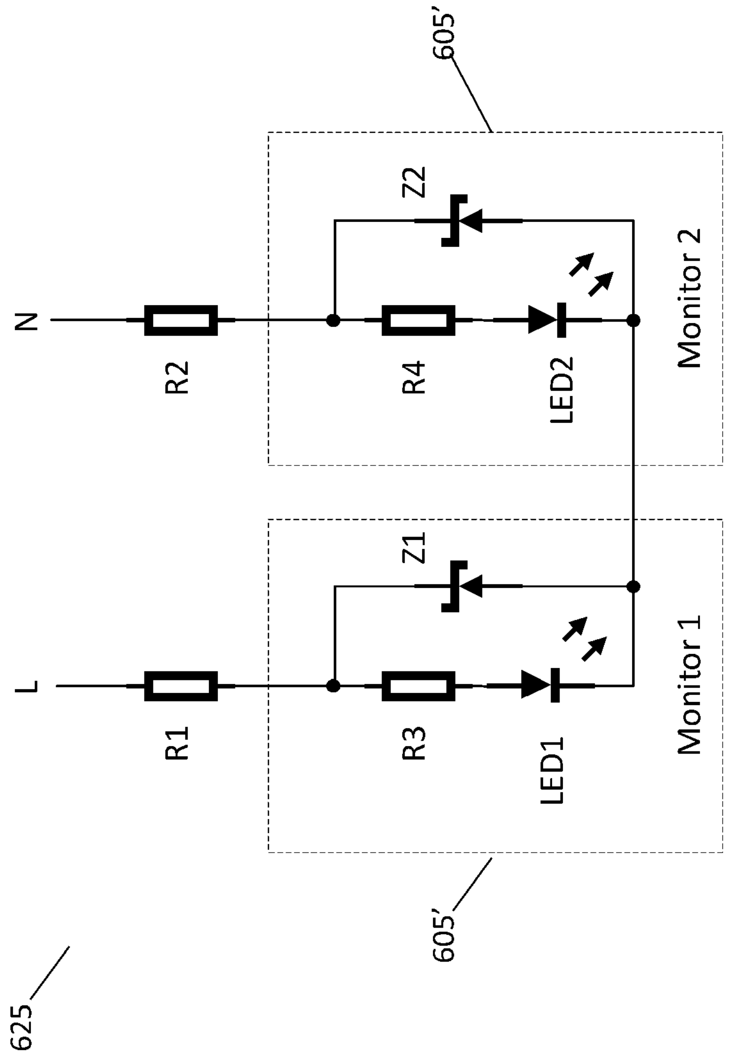
FIG. 6B is a schematic illustration of circuitry for monitoring a single-phase voltage supply in accordance with various embodiments.

As shown in FIG. 6B, a single-phase voltage supply monitor 625 with LED indicator includes two monitor blocks, one for load (L) and one for neutral (N). Each block can include a resistor divider (R1, R2) for dropping high voltage to a lower value, a LED (LED1, LED2) to display the status of the voltage source (L, N), a Zener diode (Z1, Z2) to protect the LED (LED1, LED2) from reverse voltage and to clamp the voltage across the respective monitor block, which maintains the brightness of the respective LED under varying input voltage sources, and current limiting resistors (R3, R4).

Figure 6C:
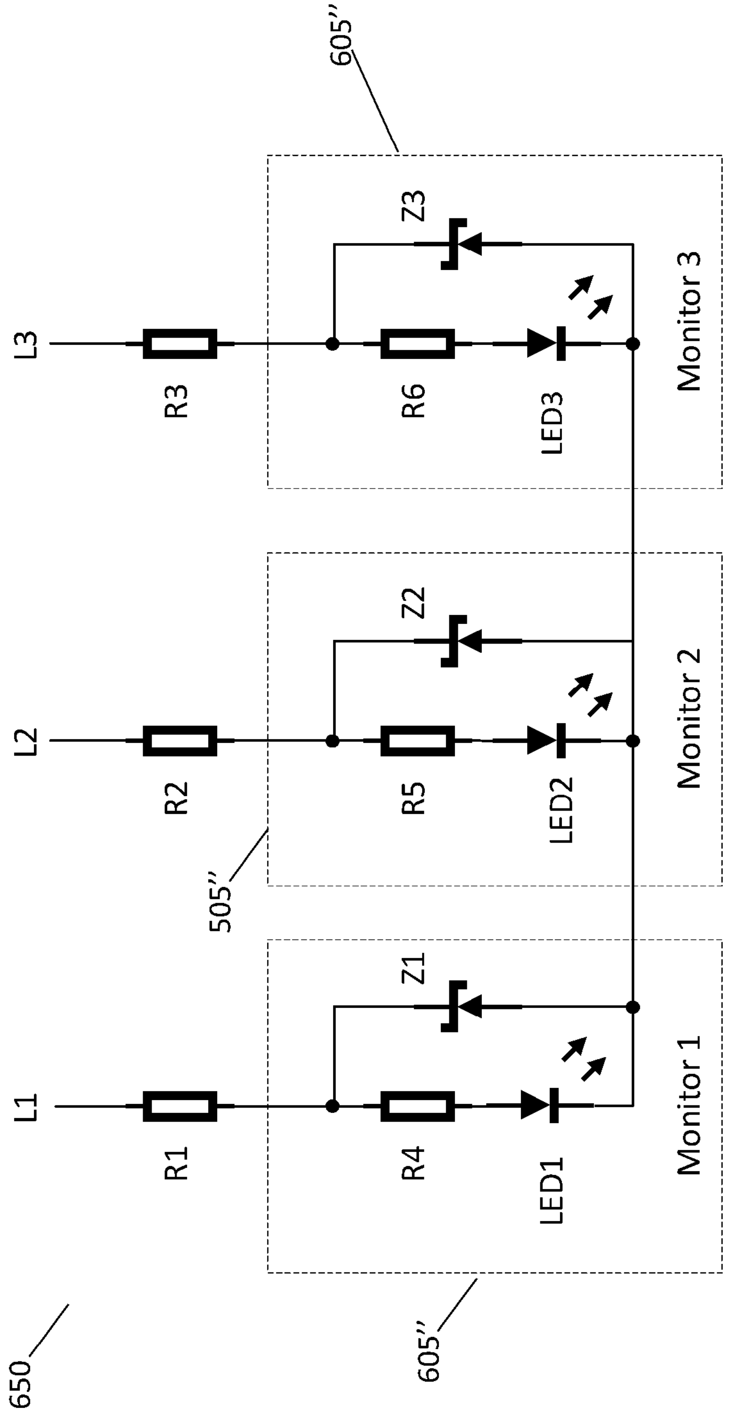
FIG. 6C is a schematic illustration of circuitry for monitoring three-phase voltage supply in accordance with various embodiments.

As shown in FIG. 6C, a three-phase voltage supply monitor 650 with LED indicator includes three monitor blocks, one for each line (L1, L2, L3). Each block includes a resistor divider (R1, R2, R3) for dropping high voltage to a lower value, a LED (LED1, LED2, LED3) to display the status of the voltage source (L1, L2, L3), a Zener diode (Z1, Z2, Z3) to protect the LED (LED1, LED2, LED3) from reverse voltage and to clamp the voltage across the respective monitor block, which maintains the brightness of the respective LED under varying input voltage sources, and current limiting resistors (R4, R5, R6).

Figure 6D:
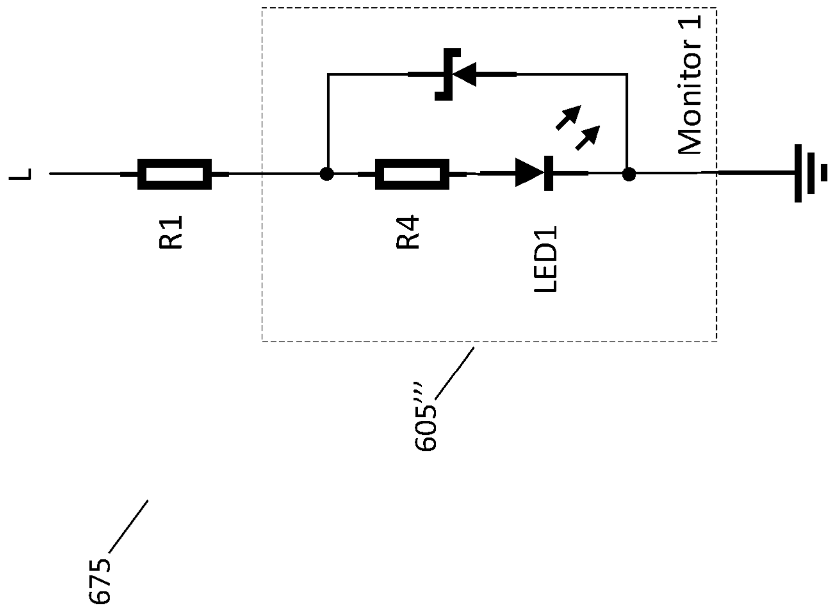
FIG. 6D is a schematic illustration of circuitry for monitoring ground continuity in accordance with various embodiments.

As shown in FIG. 6D, a ground continuity monitor 675 with LED indicator includes one monitor block, connecting a load (L) to earth ground (PE). The block includes a resistor divider (R1) for dropping high voltage to a lower value, a LED (LED1) to display the status of the ground continuity, a Zener diode to protect the LED (LED1) from reverse voltage and to clamp the voltage across the respective monitor block, which maintains the brightness of the respective LED under varying input voltage sources, and a current limiting resistor (R4).

Figure 4B:
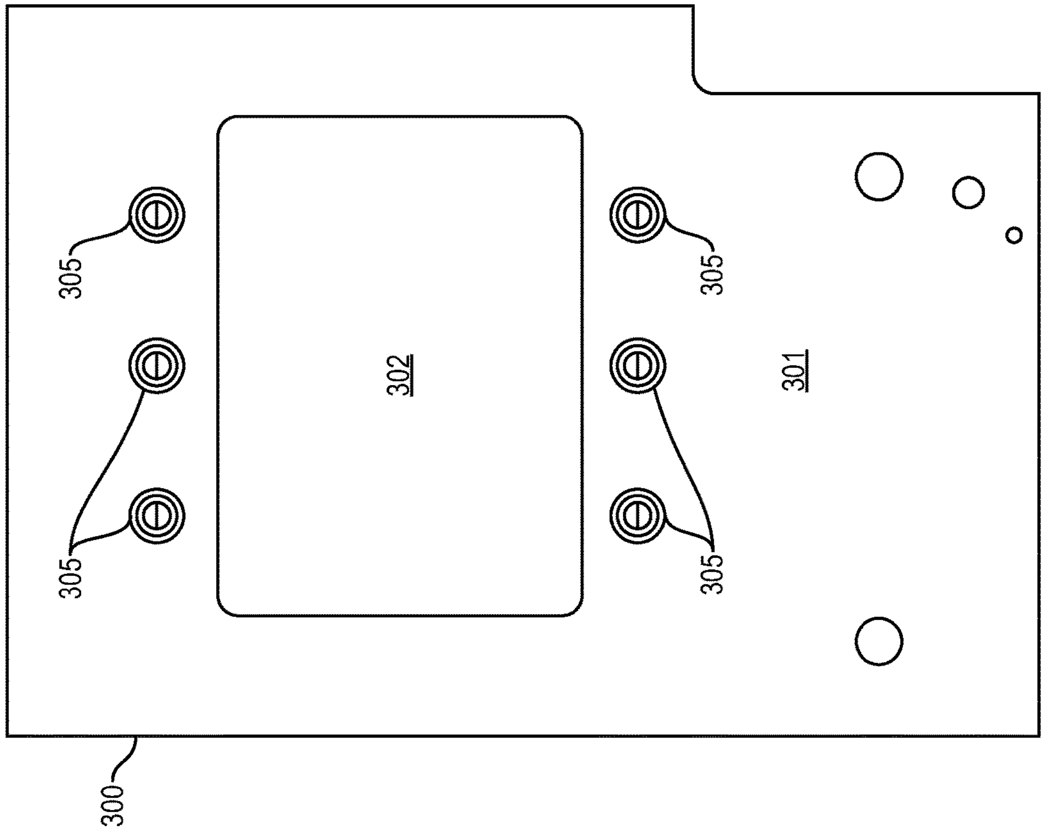
FIG. 4B is a bottom plan view of the exemplary circuit monitoring indicator board of FIG. 4A in accordance with various embodiments.
Figure 4A:
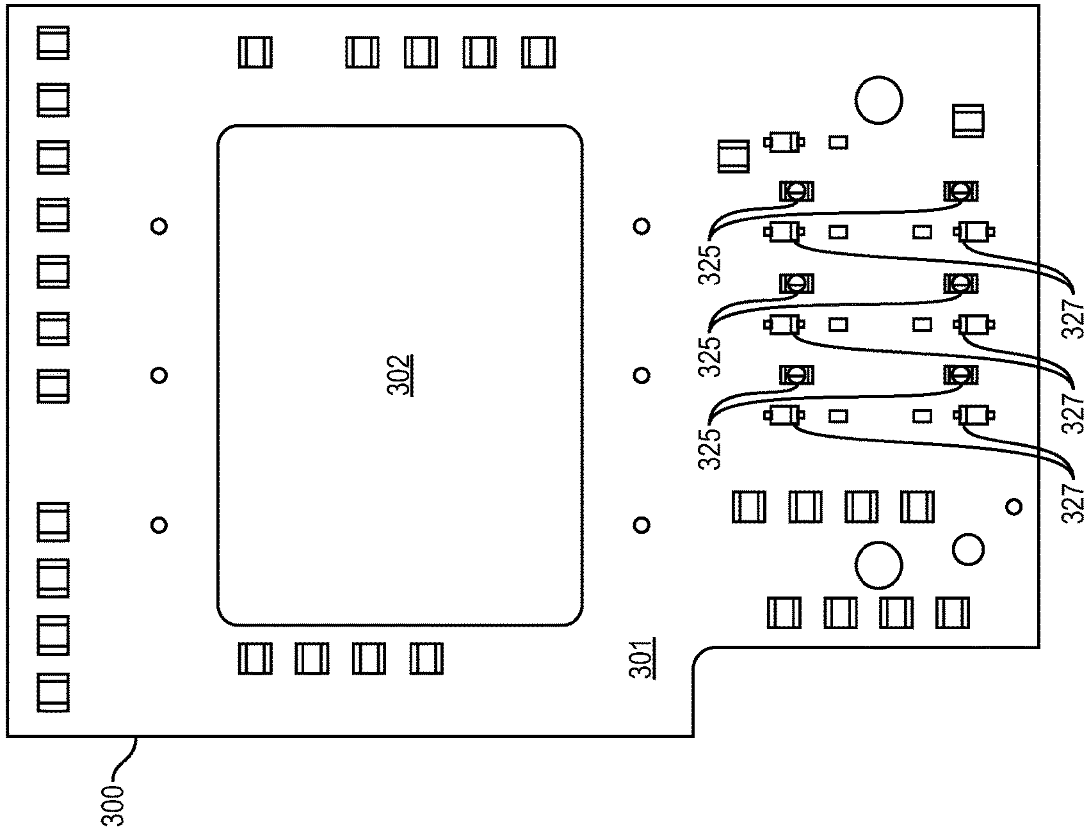
FIG. 4A is a top plan view of an exemplary circuit monitoring indicator board in accordance with various embodiments.
Figure 4C:
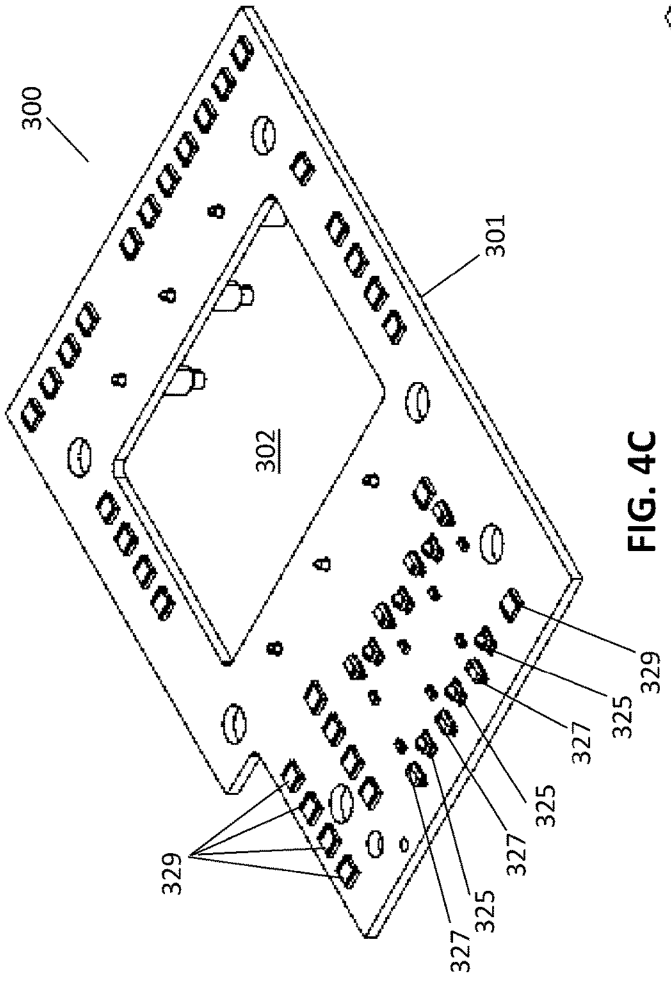
FIG. 4C is an upper front isometric view of the exemplary circuit monitoring indicator board of FIG. 4A in accordance with various embodiments.
Figure 4D:
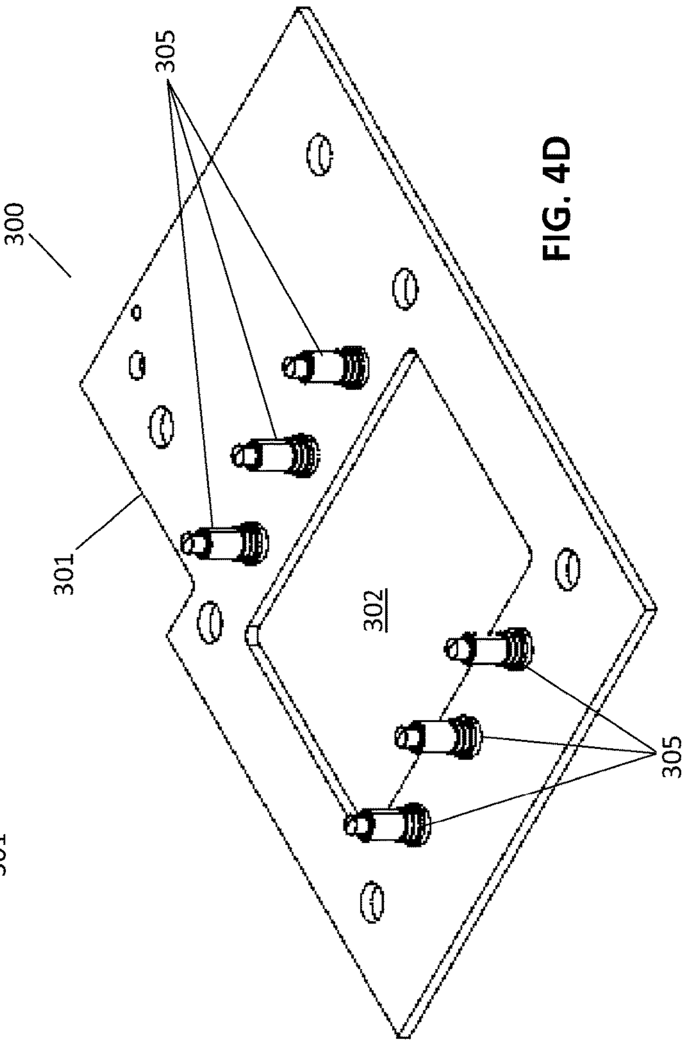
FIG. 4D is a lower rear isometric view of the exemplary circuit monitoring indicator board of FIG. 4A in accordance with various embodiments.
Figure 4E:
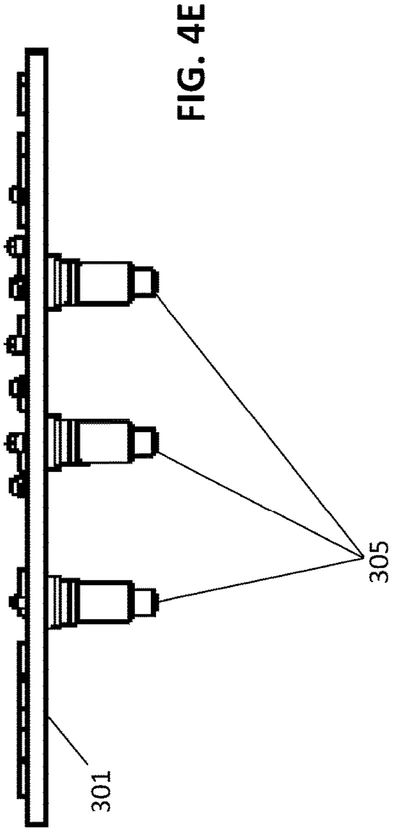
FIG. 4E is a front side view of the exemplary circuit monitoring indicator board of FIG. 4A in accordance with various embodiments.
Figure 4F:
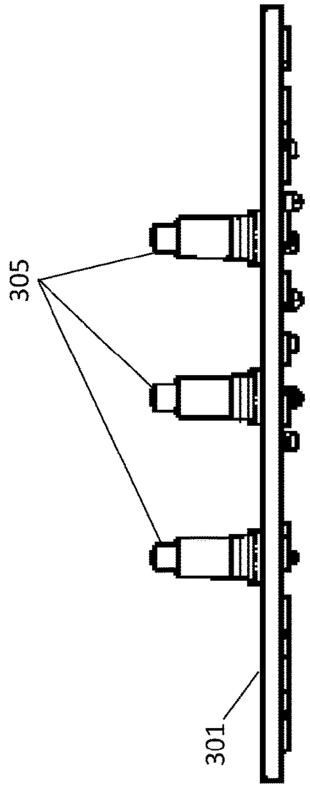
FIG. 4F is a rear side view of the exemplary circuit monitoring indicator board of FIG. 4A in accordance with various embodiments.
Figure 4H:
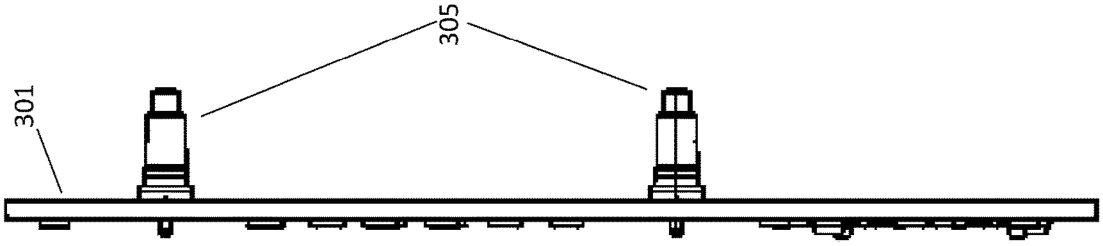
FIG. 4H is a right side view of the exemplary circuit monitoring indicator board of FIG. 4A in accordance with various embodiments.
Figure 4G:
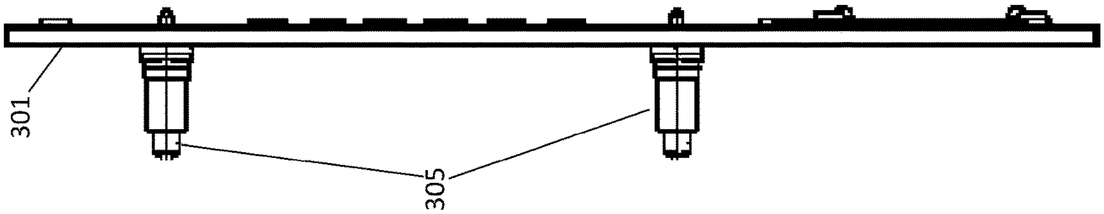
FIG. 4G is a left side view of the exemplary circuit monitoring indicator board of FIG. 4A in accordance with various embodiments.
Figure 7:
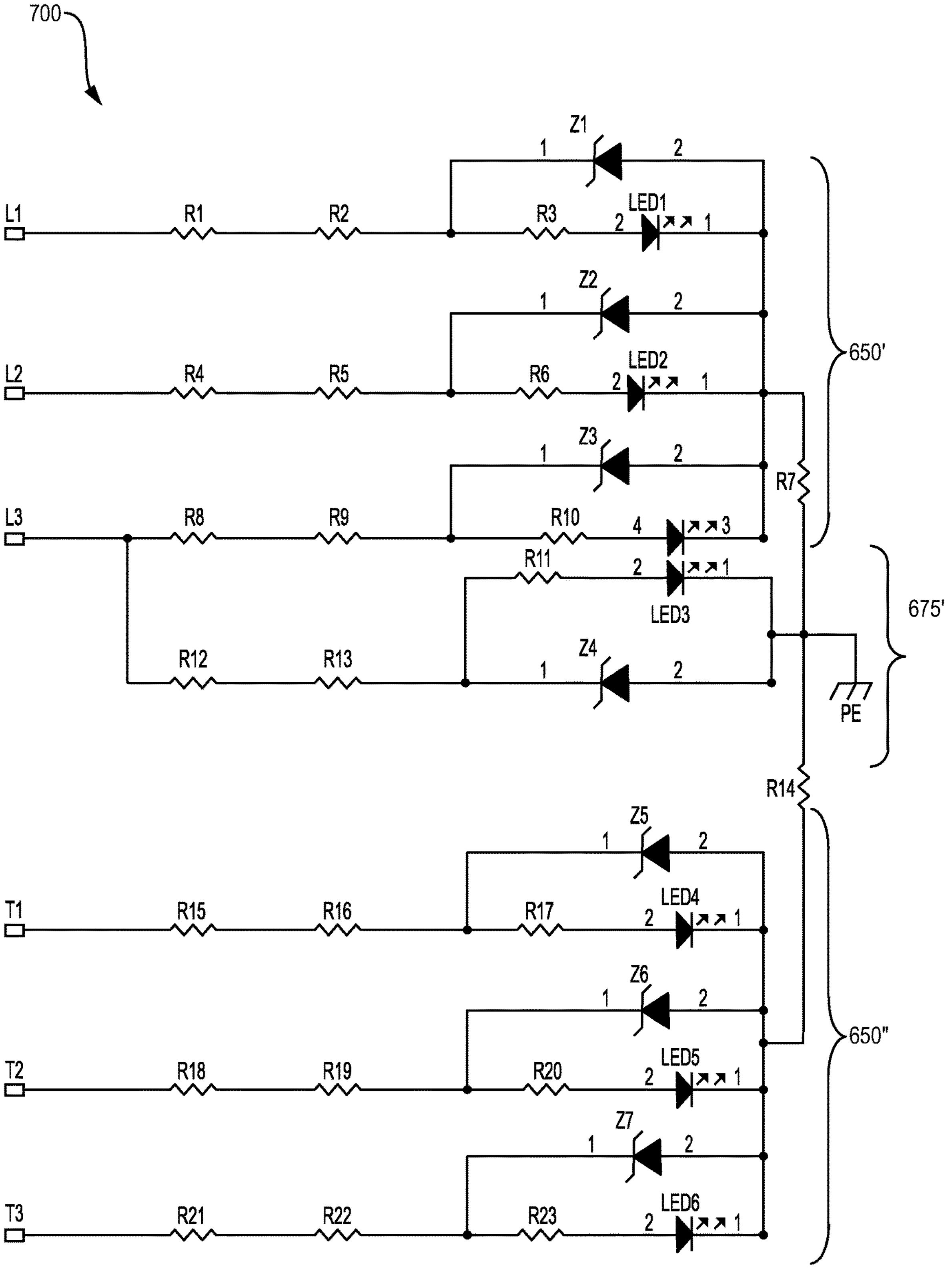
FIG. 7 is a schematic illustration of circuitry for the exemplary circuit monitoring indicator board of FIG. 4A in accordance with various embodiments.

FIG. 7 illustrates exemplary monitor circuitry 700 for the embodiment of monitor circuit 300 illustrated in FIG. 4A, which includes two three-phase voltage supply monitors 650', 650" with LED indicator, one for line side voltage monitoring of lines (L1, L2, L3) and one for load line voltage monitoring of lines (T1, T2, T3), as well as one ground continuity monitor 675' with LED indicator. The line side three-phase monitor 650' includes three monitor blocks, one for each line (L1, L2, L3). Each block includes a resistor divider having two resistors in series (R1/R2, R4/R5, R7/R8) for dropping high voltage to a lower value, a LED (LED1, LED2, LED3) to display the status of the voltage source (L1, L2, L3), except that here L3 has been grounded and thus LED3 is used instead to indicate ground continuity.

Each block also includes a Zener diode (Z1, Z2, Z3) to protect the LED (LED1, LED2, LED3) from reverse voltage and to clamp the voltage across the respective monitor block, which maintains the brightness of the respective LED under varying input voltage sources, and current limiting resistors (R3, R6, R10).

The load side three-phase monitor 650" includes three monitor blocks, one for each line (T1, T2, T3). Each block includes a resistor divider having two resistors in series (R15/R16, R18/R19, R21/R22) for dropping high voltage to a lower value, a LED (LED4, LED5, LED6) to display the status of the voltage source (T1, T2, T3), a Zener diode (Z5, Z6, Z7) to protect the LED (LED4, LED5, LED6) from reverse voltage and to clamp the voltage across the respective monitor block, which maintains the brightness of the respective LED under varying input voltage sources, and current limiting resistors (R17, R20, R23).

The ground continuity monitor 675' includes one monitor block, connecting load (L3) to earth ground (PE). The block includes a resistor divider having two resistors in series (R12, R13) for dropping high voltage to a lower value, a LED (LED3) to display the status of the ground continuity, a Zener diode (Z4) to protect the LED (LED3) from reverse voltage and to clamp the voltage across the respective monitor block, which maintains the brightness of the respective LED under varying input voltage sources, and a current limiting resistor (R11). Two resistors (R7, R14) are also interposed between each of the three-phase monitors and PE.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications, and variations may be effected to the particular embodiments by those of skill in the art without departing from the scope of the invention, which is defined solely by the claims appended hereto. The invention is therefore not limited by the above-described embodiments and examples.

Having described the invention, and a preferred embodiment thereof, what is claimed as new and secured by letters patent is:

What is claimed is:

1. A power switch assembly comprising:

a power switch enclosure including:

a box portion defining a box cavity, and a cover portion defining a cover cavity removably attachable to the box portion to form the power switch enclosure and to define an interior cavity comprising the combined box cavity and cover cavity;

a power switch installed in the box cavity and having a plurality of terminals;

a handle shaft extending through a wall of the cover portion, the handle shaft including:

a switch end extending into the interior cavity of the power switch enclosure and configured for operatively engaging the power switch, and a handle end extending out of the interior cavity and away from an exterior surface of the wall of the cover portion, the handle end configured for operatively engaging a handle positioned on the exterior surface of the wall of the cover portion; and a monitor circuit including:

a circuit board attached to the cover portion in the cover cavity, the circuit board having a first side facing the wall of the cover portion and a second side facing away from the wall of the cover portion, monitor circuitry formed on at least one of the first side or the second side of the circuit board, and a plurality of connectors at least partially installed on the second side of the circuit board, wherein the connectors are configured, upon attachment of the cover portion to the box portion and without manual disconnection or reconnection of wires, to electrically interact with a corresponding terminal of the power switch to establish electrical communication between the corresponding terminal of the power switch and the monitor circuitry of the monitor circuit, and wherein the connectors are configured, without manual disconnection or reconnection of wires, to terminate the electrical interactions upon removal of the cover portion from the box portion.

2. The power switch assembly of claim 1, wherein, responsive to the electrical communication between the corresponding terminals of the power switch and the monitor circuit having the monitor circuitry, the monitor circuitry indicates a line status associated with the corresponding terminal of the power switch.

3. The power switch assembly of claim 1, further comprising at least one alignment bracket mounted to the second side of the circuit board and including a guide surface extending from the second side of the circuit board, the guide surface sized and positioned to slide over an exterior surface of the power switch to align the connectors with the corresponding terminals of the power switch.

4. The power switch assembly of claim 1, wherein the connectors include one or more of spring-loaded pins, fixed point-contact pins, lever contacts, leaf spring contacts, HDMI connectors, USB connectors, USB-C connectors, Lightning connectors, hall effect sensors, field sensors, Rogowski coils, iron-core current transformers, or combinations thereof.

5. The power switch assembly of claim 1, wherein the terminals include one or more of contact terminals, terminal conductors, terminal screws, lever connectors, leaf springs, HDMI terminals, USB terminals, USB-C terminals, Lightning terminals, conductive plates, coils, or combinations thereof.

6. The power switch assembly of claim 1, wherein the monitor circuitry includes one or more of LEDs, diodes, Zener diodes, resistors, microcontrollers, integrated chips, microprocessors, power monitoring circuitry, display elements, digital displays, screens, touch screens, auditory elements, sirens, speakers, alarms, horns, communications equipment, Wi-Fi circuitry, Bluetooth circuitry, Bluetooth low energy circuitry, ZigBee circuitry, cellular circuitry, RS485 circuitry, ethernet circuitry, transceivers, receivers, transmitters, signal processing circuitry, or combinations thereof.

7. The power switch assembly of claim 6, wherein the monitor circuitry is configured to monitor at least one characteristic of an electrical source electrically connected to the power switch.

8. The power switch assembly of claim 7, wherein the at least one characteristic includes one or more of voltage, frequency power level, power transmission signal characteristics, change in power transmission characteristics over time, power consumption, power failures, power surges, out of tolerance power conditions, or combinations thereof.

9. The power switch assembly of claim 7, wherein the monitor circuitry is further configured to at least one of collect monitoring data generated by the monitor circuitry, analyze monitoring data generated by the monitor circuitry, indicate a status of the monitored characteristic, transmit monitoring data generated by the monitor circuitry, transmit and indication of the status of the monitored characteristic, receive remote commands for operating the power switch, or combinations thereof.

10. The power switch assembly of claim 6, wherein the monitor circuitry includes an LED circuit corresponding to each of the terminals of the power switch in communication with the monitor circuit having the monitor circuitry.

11. The power switch assembly of claim 10, wherein each LED circuit includes an LED configured to emit light responsive to a monitored voltage or earth ground continuity.

12. The power switch assembly of claim 11, wherein the wall of the cover portion includes a plurality of apertures each positioned to permit the light emitted by at least one of the LEDs to be transmitted therethrough.

13. The power switch assembly of claim 12, further comprising a lens device including:

a base having first side facing the wall of the cover portion and a second side facing away from the wall of the cover portion, a plurality of lens elements formed on and extending from the first side of the base, the plurality of lens elements each corresponding to and extending into one of the plurality of apertures.

14. The power switch assembly of claim 13, wherein the lens device further comprises a plurality of lightguides formed on and extending from the second side of the base, each extending toward a corresponding one of the LEDs of the monitor circuitry, the plurality of light guides each configured to direct light emitted by the corresponding one of the LEDs through a corresponding one of the lens elements.

15. The power switch assembly of claim 1, further comprising a jog switch installed through the wall of the cover portion.

16. The power switch assembly of claim 1, further comprising a backplate attached to a wall of the box portion in the box cavity and having at least one conduit entry port defined therein.

17. The power switch assembly of claim 16, wherein the backplate further comprises a rail formed thereon and sized to engage one or more channels of the power switch.

18. The power switch assembly of claim 17, wherein the rail is integrally formed from the backplate.

19. The power switch assembly of claim 17, wherein the rail is separate from and attached to the backplate.

20. The power switch assembly of claim 17, wherein the rail is a DIN rail.

* * * * *